(12) United States Patent
Asai

(10) Patent No.: US 11,926,007 B2
(45) Date of Patent: Mar. 12, 2024

(54) PRESS-FITTING METHOD AND PRODUCTION METHOD FOR PRESS-FIT PRODUCT

(71) Applicant: HIRATA CORPORATION, Kumamoto (JP)

(72) Inventor: Ryota Asai, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 0 days.

(21) Appl. No.: 18/255,200

(22) PCT Filed: Nov. 17, 2021

(86) PCT No.: PCT/JP2021/042298
§ 371 (c)(1),
(2) Date: May 31, 2023

(87) PCT Pub. No.: WO2022/118660
PCT Pub. Date: Jun. 9, 2022

(65) Prior Publication Data
US 2024/0024994 A1    Jan. 25, 2024

(30) Foreign Application Priority Data
Dec. 1, 2020 (SG) .......................... 10202011992W

(51) Int. Cl.
*B23P 19/02* (2006.01)
*B23P 19/10* (2006.01)
*B23P 19/12* (2006.01)

(52) U.S. Cl.
CPC ............ *B23P 19/02* (2013.01); *B23P 19/105* (2013.01); *B23P 19/12* (2013.01)

(58) Field of Classification Search
CPC .......... B23P 19/02; B23P 19/105; B23P 19/12
See application file for complete search history.

(56) References Cited

U.S. PATENT DOCUMENTS 3,283,699 A * 11/1966 Hawkins ................... B30B 1/32
                                                        100/214
5,315,752 A *  5/1994 Ohta ..................... H02K 15/028
                                                         29/256

(Continued)

FOREIGN PATENT DOCUMENTS

CN    110303325 A  * 10/2019 ............ B23P 19/001
JP    H04109818 U     9/1992

(Continued)

OTHER PUBLICATIONS

International Search Report (PCT/ISA/210) with English translation and Written Opinion (PCT/ISA/237) dated Feb. 8, 2022, by the Japanese Patent Office as the International Searching Authority for International Application No. PCT/JP2021/042298.

*Primary Examiner* — Jermie E Cozart
(74) *Attorney, Agent, or Firm* — BUCHANAN INGERSOLL & ROONEY PC

(57) ABSTRACT

A press-fitting direction position of a pressing surface of a pressing portion of a press-fitting tool and a press-fitting direction position of a restriction surface of a restriction portion of the press-fitting tool are set so that one of a press-fitting component and a press-fitting target component is stopped at a prescribed press-fitting stop position. A press-fitting method includes: adjusting a press-fitting interval dimension in a press-fitting direction between the pressing surface of the pressing portion and the restriction surface of the restriction portion so as to obtain a press-fitting stop position that is set according to component dimensions of the press-fitting component and component dimensions of the press-fitting target component; press-fitting the press-fitting component with the press-fitting target component; and stopping the press-fitting of the press-fitting component with the press-fitting target component by bringing the (Continued)

restriction portion into contact with the press-fitting target component.

19 Claims, 21 Drawing Sheets

(56) References Cited

U.S. PATENT DOCUMENTS

| | | | | |
|---|---|---|---|---|
| 6,408,531 | B1 * | 6/2002 | Schimmels | B25J 17/0208 |
| | | | | 33/644 |
| 9,669,501 | B1 * | 6/2017 | Dolan | B23P 19/04 |
| 2011/0301875 | A1 * | 12/2011 | Ito | B23P 19/02 |
| | | | | 702/41 |
| 2017/0232528 | A1 * | 8/2017 | Dolan | B23P 19/04 |
| | | | | 408/1 R |
| 2023/0112234 | A1 * | 4/2023 | Mikulsky | E04C 5/12 |
| | | | | 29/428 |

FOREIGN PATENT DOCUMENTS

| | | | | |
|---|---|---|---|---|
| JP | H06126551 | A | | 5/1994 |
| JP | 09272025 | A | * | 10/1997 |
| JP | H1076435 | A | | 3/1998 |
| JP | 2001310221 | A | | 11/2001 |
| JP | 2003011023 | A | | 1/2003 |
| JP | 3511799 | B2 | | 1/2004 |
| JP | 2018153897 | A | | 10/2018 |
| JP | 2019122146 | A | | 7/2019 |

* cited by examiner

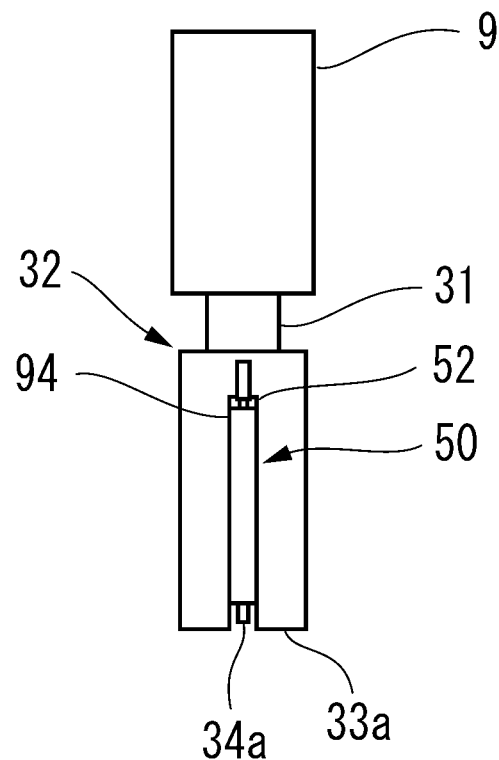
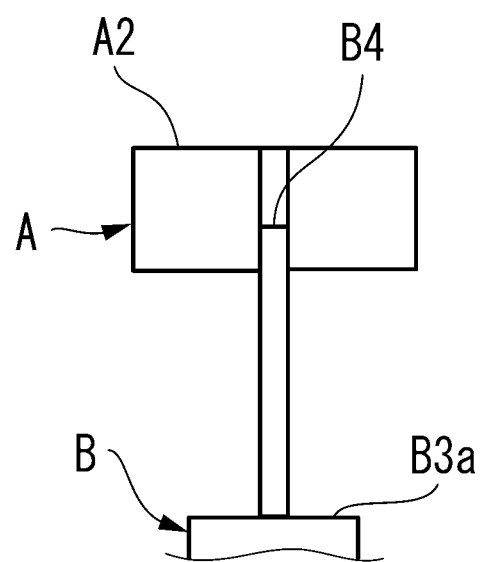
FIG. 10B

FIG. 13

| 34 | H4 [mm] | HT [mm] | H3 [mm] |
|---|---|---|---|
| 341 | 10.040 | 0.040 | 0.030~0.050 |
| 342 | 10.020 | 0.020 | 0.010~0.030 |
| 343 | 10.000 | 0.000 | -0.010~0.010 |
| 344 | 9.980 | -0.020 | -0.030~-0.010 |
| 345 | 9.960 | -0.040 | -0.050~-0.030 |

PRESS-FITTING METHOD AND PRODUCTION METHOD FOR PRESS-FIT PRODUCT

TECHNICAL FIELD

The present disclosure relates to a press-fitting method and a production method for a press-fit product.

BACKGROUND ART

Press-fitting devices for producing a press-fit product by press-fitting a press-fitting component into or with a press-fitting target component are known from Patent Literature 1 etc. Patent Literature 1 discloses a press-fitting device that measures a distance between a work and a press-fitting tool with a sensor and keeps a press-fitting distance constant based on an output of the sensor.

CITATION LIST

Patent Literature

Patent Literature 1: JPH06-126551A

SUMMARY OF INVENTION

Technical Problem

Incidentally, the press-fitting device disclosed in Patent Literature 1 measures a distance between the work and the press-fitting tool with the sensor and a control portion acquires a measurement value of the distance measured by the sensor. The control portion calculates, based on a measurement value, a movement distance value by which to move the press-fitting tool. To move the press-fitting tool, the control portion sends an operation instruction value to a motor based on the movement distance value calculated by itself. The control portion acquires, in real time, a value of a measurement distance between the work and the press-fitting tool measured by the sensor as the press-fitting tool is moved, and compares the measurement distance value with the calculated movement distance value. The control portion performs information processing for sending a stop instruction value to the motor so that the press-fitting tool stops when having moved by a prescribed distance corresponding to the calculated movement distance value that coincides with the measurement distance value.

However, the above press-fitting device has a problem that a delay occurs from intended timing to stop the press-fitting tool due to times taken by the detection by the sensor, the calculation by the control portion, the driving of the motor, etc. and, as a result, the press-fitting tool advances to a position past the intended position where to stop it. As such, the above press-fitting device cannot necessarily produce a press-fit product with high accuracy.

In view of the above circumstances in the art, and an object of the present disclosure is therefore to provide a press-fitting method and a production method for a press-fit product capable of press-fitting a press-fitting component into or with a press-fitting target component with high accuracy.

Solution to Problem

To attain the above object, one aspect of the present disclosure provides a press-fitting method for press-fitting one of a press-fitting component and a press-fitting target component into or with the other by moving the one of the press-fitting component and the press-fitting target component in a press-fitting direction using a press-fitting tool, wherein:

the press-fitting tool including:
  a pressing portion having a pressing surface to come into contact with the press-fitting component; and
  a restriction portion having a restriction surface configured to come into contact with the press-fitting target component,
a press-fitting direction position of the pressing surface of the pressing portion and a press-fitting direction position of the restriction surface of the restriction portion are set so that the one of the press-fitting component and the press-fitting target component is stopped at a prescribed press-fitting stop position,
the press-fitting method including:
  a press-fitting stop position adjusting step of adjusting a press-fitting interval dimension in the press-fitting direction between the pressing surface of the pressing portion and the restriction surface of the restriction portion so as to obtain the press-fitting stop position of the press-fitting component that is set in the press-fitting target component according to component dimensions of the press-fitting component and component dimensions of the press-fitting target component;
  a press-fitting step of press-fitting the press-fitting component with the press-fitting target component; and
  a press-fitting completion step of stopping the press-fitting of the press-fitting component with the press-fitting target component by bringing the restriction portion into contact with the press-fitting target component.

To attain the above object, another aspect of the present disclosure provides a production method for producing a press-fit product in which a press-fitting component is fitted with a press-fitting target component, including:

a preparing step of preparing the press-fitting component and the press-fitting target component; and
a press-fitting step of press-fitting one of the press-fitting component and the press-fitting target component into or with the other by moving the one of the press-fitting component and the press-fitting target component in a press-fitting direction using a press-fitting tool, wherein:
the press-fitting tool includes:
  a pressing portion having a pressing surface configured to come into contact with the press-fitting component; and
  a restriction portion having a restriction surface configured to come into contact with the press-fitting target component,
a press-fitting direction position of the pressing surface of the pressing portion and a press-fitting direction position of the restriction surface of the restriction portion are set so that the one of the press-fitting component and the press-fitting target component is stopped at a prescribed press-fitting stop position; and
the press-fitting step includes:
  a press-fitting stop position adjusting step of adjusting a press-fitting interval dimension in the press-fitting direction between the pressing surface of the pressing portion and the restriction surface of the restriction portion so as to obtain the press-fitting stop position of the press-fitting component that is set in the press-fitting target component according to component dimensions of the press-fitting component and component dimensions of the press-fitting target component;

a press-fitting step of press-fitting the press-fitting component with the press-fitting target component; and a press-fitting completion step of stopping the press-fitting of the press-fitting component with the press-fitting target component by bringing the restriction portion into contact with the press-fitting target component.

Advantageous Effects of Invention

The present disclosure provides a press-fitting method and a production method for a press-fit product capable of press-fitting a press-fitting component into or with a press-fitting target component with high accuracy.

BRIEF DESCRIPTION OF DRAWINGS

FIG. 10B is a diagram schematically showing positional relationships between a press-fitting component, a press-fitting target component, and the press-fitting tool in respective steps.

FIG. 13 is a table of sets of pieces of information of the plural restriction portions of the press-fitting device according to the embodiment.

DESCRIPTION OF EMBODIMENTS

Figure 1:
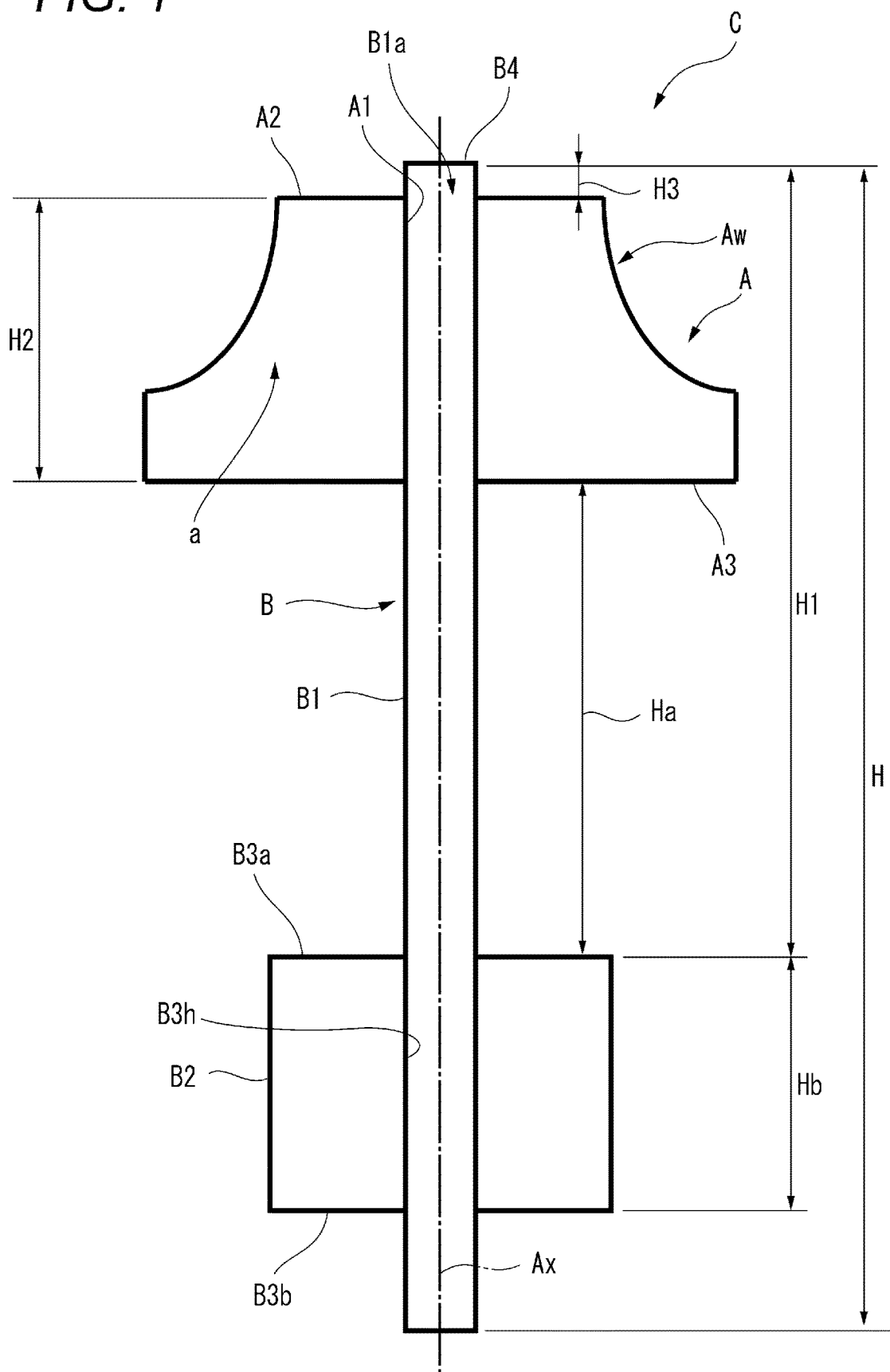
FIG. 1 shows a press-fit product to be produced by the press-fitting method according to an embodiment.

An embodiment of the present disclosure will be herein described with reference to the drawings. For the sake of convenience, sets of dimensions of individual components shown in the drawings may be different from actual ones of those components.

A press-fitting method according to the embodiment is to produce a press-fit product C by a press-fitting method for press-fitting one of a press-fitting component A and a press-fitting target component B into or with the other of them by moving the former in a press-fitting direction by a press-fitting tool. The following description will be directed to a case that the press-fitting component A is press-fitted with the press-fitting target component B. More specifically, a rotary assembly C (press-fit product C) of a motor is produced by press-fitting an impeller A (press-fitting component A) with a rotor shaft B (press-fitting target component B) of the rotary assembly C.

FIG. 1 shows the rotary assembly C (press-fit product C) to be produced by the press-fitting method according to the embodiment. As shown in FIG. 1, the rotor shaft B has a shaft portion B1 and a rotary main body B2 which rotates together with the shaft portion B1. The shaft portion B1 is a cylindrical, rod-shaped member having a prescribed length H and diameter. The shaft portion B1 includes, on one side, an attachment target portion B1a to which the impeller A is to be fitted with and is integrated with the rotary main body B2 on the other side. The rotary main body B2 has a prescribed length Hb that is shorter than the length H of the shaft portion B1 and a diameter that is larger than the diameter of the shaft portion B1, and is formed with, as a surface perpendicular to the axial direction, one surface B3a on one side in the axial direction which is parallel with the rotation axis of the rotary main body B2 and is also formed with, as a surface perpendicular to the axial direction, another surface B3b on the other side in the axial direction.

The impeller A has an impeller main body a having a prescribed length that is shorter than the length H of the shaft portion B1 and a diameter that is larger than the diameter of the shaft portion B1, a top surface A2 that is located on one side, in the axial direction, of the impeller main body a and is perpendicular to the axial direction, a bottom surface A3 that is located on the other side, in the axial direction, of the impeller main body a and is perpendicular to the axial direction, and plural blade portions Aw provided around the impeller main body a. An insertion hole A1 penetrates through the impeller main body a at its center along the rotation axis Ax so as to have openings in the top surface A2 and the bottom surface A3. The shaft portion B1 of the rotor shaft B is inserted into the insertion hole A1.

In the embodiment, the dimensional accuracy of the separation distance Ha between the one surface B3a of the rotary main body B2 of the rotor shaft B and the bottom surface A3 of the impeller A is managed. That is, to obtain the preset separation distance dimension Ha, a press-fitting length (also referred to as a "third dimension") H3 from a top surface B4 (reference surface) of the shaft portion B1 of the rotor shaft B to the top surface A2 of the impeller A is calculated on the basis of the length H1 of a portion, that can be fitted with the impeller A, of the shaft portion B1 of the rotor shaft B and a thickness H2 dimension of the impeller A in the fitting direction. A rotary assembly C (press-fit product C) having the preset separation distance dimension Ha is produced by press-fitting the impeller A with the shaft portion B1 of the rotor shaft B based on the calculated press-fitting length H3. The press-fitting method according to the embodiment makes it possible to produce each press-fit product C in which the dimensional accuracy of a portion that is set as a target portion is high even if any combination of the press-fitting component A and the press-fitting target component B having dimensional variations by managing the separation distance dimension Ha.

Figure 2:
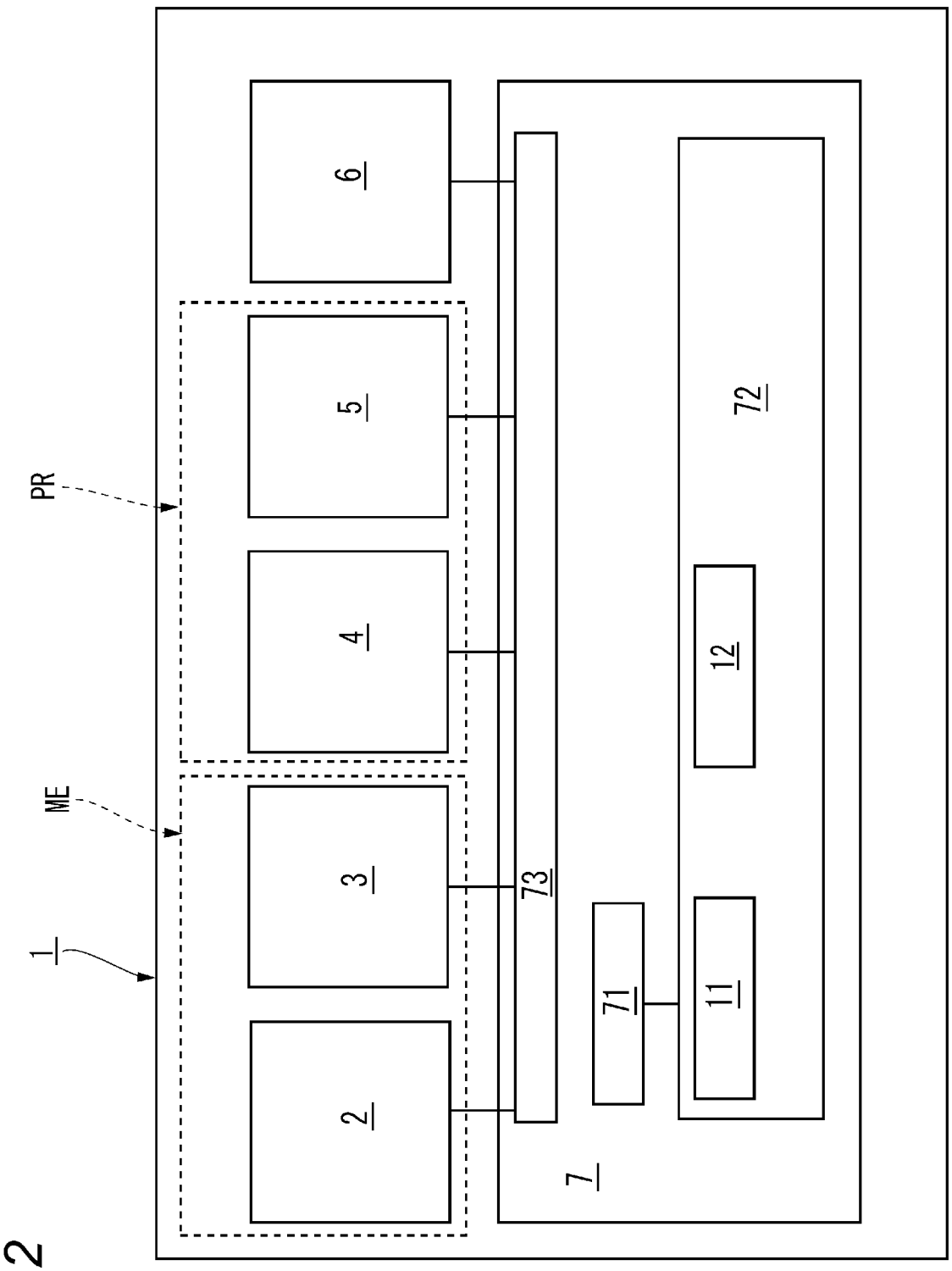
FIG. 2 is a block diagram of a production device that performs the press-fitting method according to the embodiment.

FIG. 2 is a block diagram of a production device 1 that performs the press-fitting method according to the embodiment. As shown in FIG. 2, the production device 1 includes a measuring portion ME, a press-fitting portion PR, an inspection portion 6, and a control portion 7. The measuring portion ME employed in the embodiment includes a first measuring portion 2 and a second measuring portion 3. The press-fitting portion PR employed in the embodiment also includes a tentative press-fitting portion 4 (first press-fitting portion) and a press-fitting portion 5 (second press-fitting portion). In the production device 1, the measuring portion ME measures dimensions of the press-fitting component A and the press-fitting target component B. After a tentative press-fit product is produced by fitting the press-fitting component A with the press-fitting target component B tentatively by the press-fitting portion PR, a press-fit product C is produced by fitting the press-fitting component A of the tentative press-fit product with the press-fitting target component B at a prescribed position. Then the press-fit product C is measured.

The first measuring portion 2 includes a measurement instrument (not shown) for measuring the rotor shaft B (press-fitting target component B), and the measurement instrument measures a dimension of the rotor shaft B located at a prescribed measurement position. More specifically, the rotor shaft B is set at a measurement position by a transfer portion (not shown) or an operator and a length H1 of the shaft portion B1 of the rotor shaft B shown in FIG. 1 is measured by the measurement instrument of the first measuring portion 2.

The second measuring portion 3 includes a measurement instrument (not shown) for measuring the impeller A (press-fitting component A), and the measurement instrument measures a dimension of the impeller A located at a prescribed measurement position. More specifically, the impeller A is set at a measurement position by the transfer portion (not shown) or an operator and a length (thickness) H2 of the impeller A in the direction of the rotation axis Ax is measured by the measurement instrument of the second measuring portion 3.

The tentative press-fitting portion 4 includes a press-fitting apparatus (not shown) for press-fitting the impeller A (press-fitting component A) with the rotor shaft B (press-fitting target component B), and the impeller A that is set at a prescribed tentative press-fit position is press-fitted with the rotor shaft B to a tentative position. In the embodiment, the impeller A is moved by the press-fitting apparatus (i.e., the shaft portion B1 is inserted into the impeller A) to such an extent that the impeller A does not come off the rotor shaft B, to a tentative position of the shaft portion B1 of the rotor shaft B, whereby the impeller A (located at the tentative position) and the shaft portion B1 of the rotor shaft B are integrated with each other.

The control portion 7, which is, for example, a PLC (programmable logic controller), includes a processing portion 71 such as a CPU, a storage portion 72 having a RAM, a ROM, etc., and an interface portion 73 that interfaces between the processing portion 71 and the devices outside the control portion 7. By running programs stored in the storage portion 72, the processing portion 71 performs processing corresponding to an operation of the production device 1. The storage portion 72 is stored with the programs to be run by the processing portion 71 and various kinds of data. The processing portion 71 communicates with the first measuring portion 2, the second measuring portion 3, the tentative press-fitting portion 4, the press-fitting portion 5, and the inspection portion 6 via the interface portion 73.

The control portion 7 records, in a first recording portion 11, first measurement information that is measurement information of the rotor shaft B measured by the first measuring portion 2. The control portion 7 records, in a second recording portion 12, second measurement information that is measurement information of the impeller A measured by the second measuring portion 3. The control portion 7 controls a press-fitting operation of the press-fitting portion 5 based on the pieces of measurement information obtained by the first measuring portion 2 and the second measuring portion 3. These operations will be described later in detail.

Figure 3:
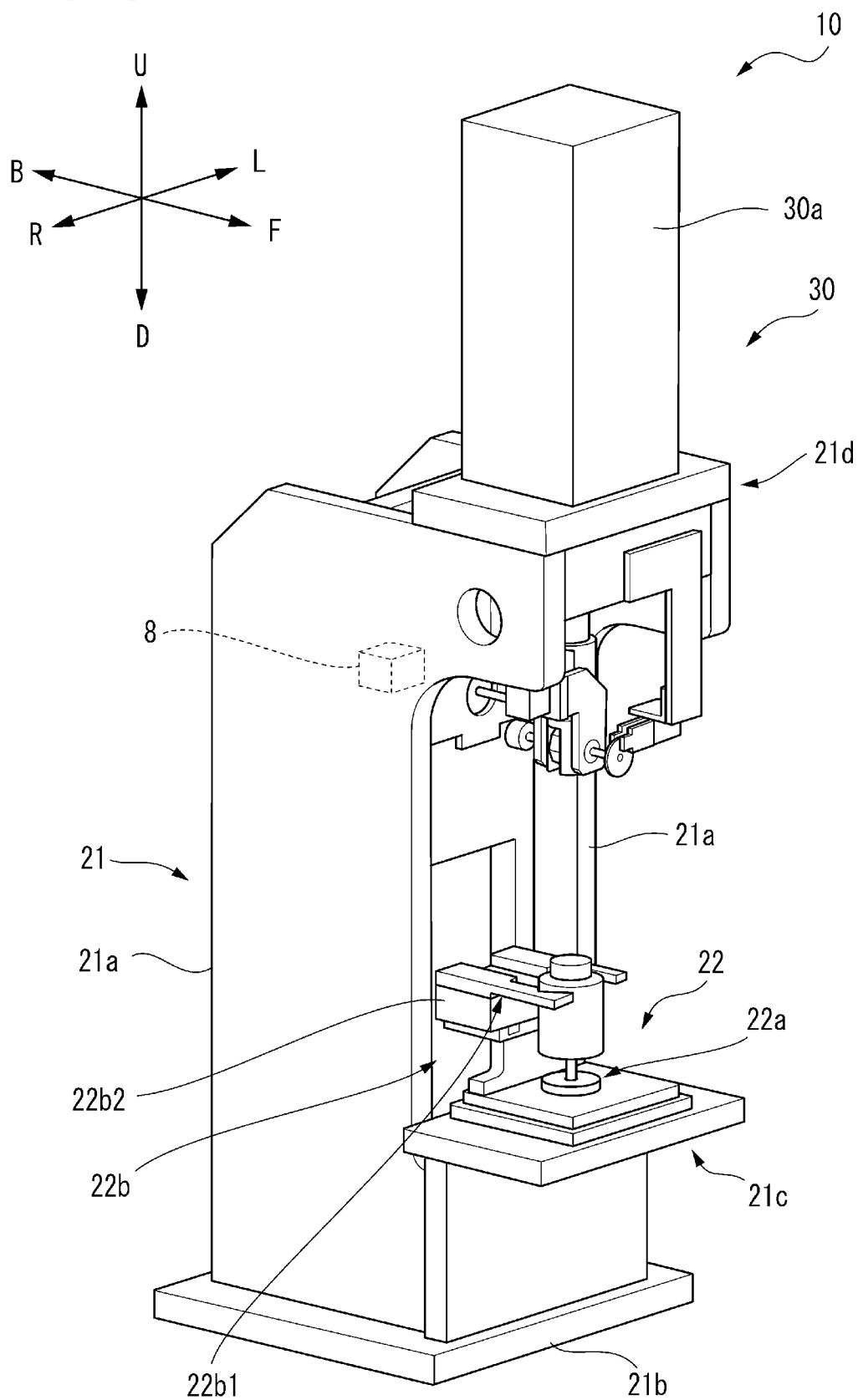
FIG. 3 is a perspective view of a press-fitting device.
Figure 4:
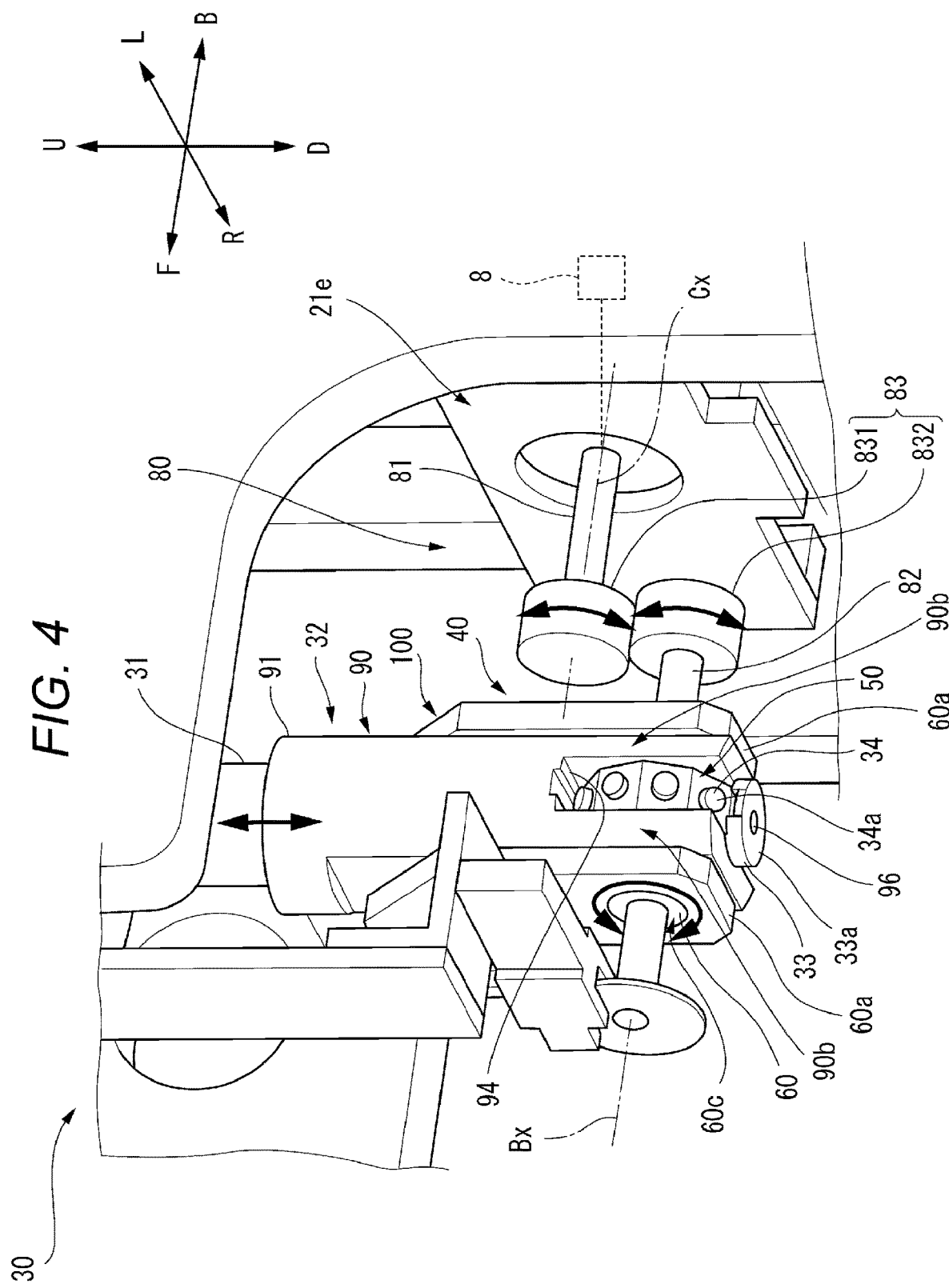
FIG. 4 is a perspective view showing a pressing mechanism.
Figure 7:
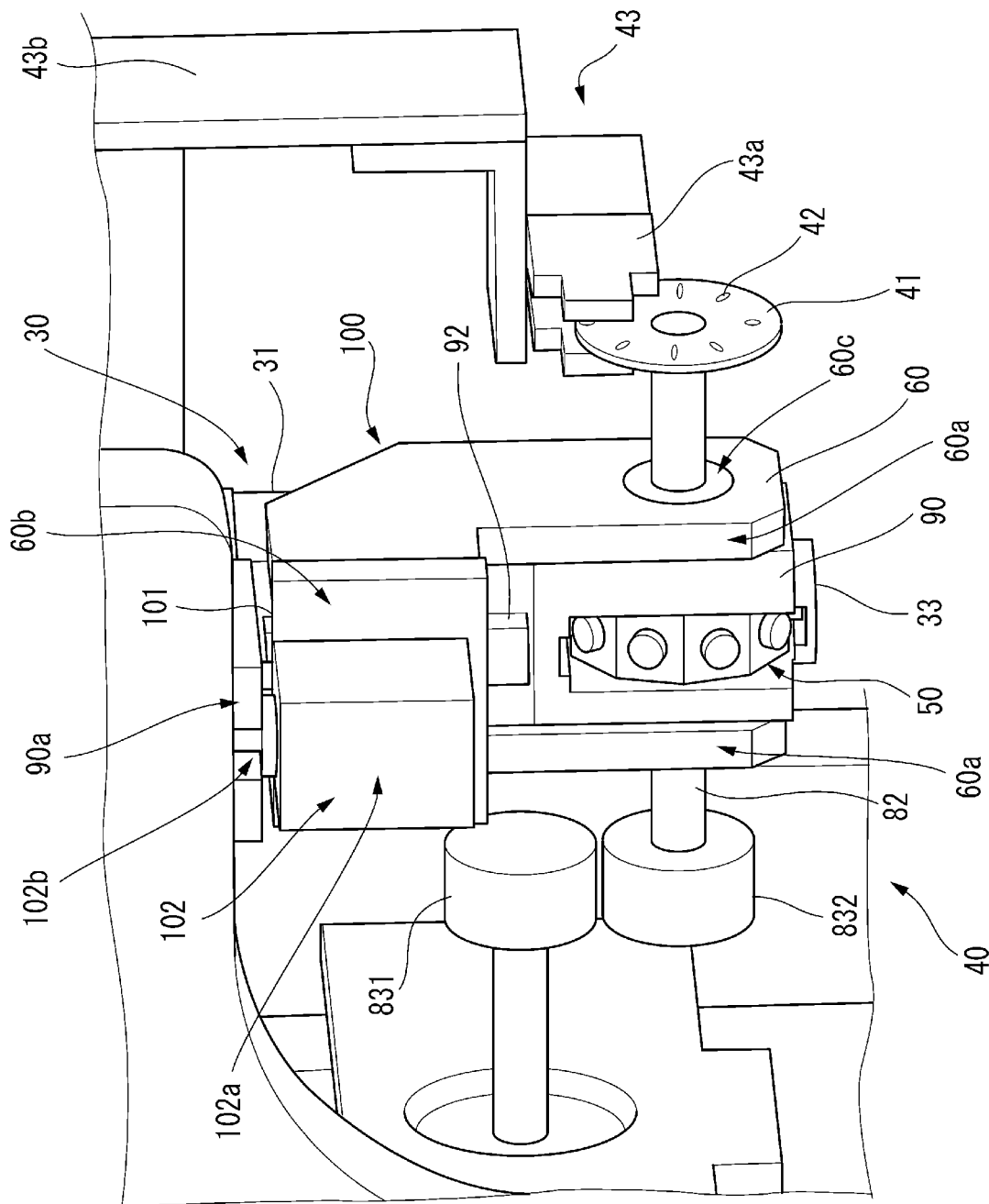
FIG. 7 is a perspective view including the press-fitting jig and the pressing mechanism as view from the side opposite to the side from which they are viewed in FIG. 4.

The press-fitting portion 5 includes a press-fitting device 10 for press-fitting the impeller A that is set at the prescribed press-fitting position with the rotor shaft B. FIG. 3 is a perspective view of the press-fitting device 10. As shown in FIG. 3, the press-fitting device 10 has a frame 21, a support portion 22, and a pressing mechanism 30. FIGS. 3, 4, and 7 are perspective views of the press-fitting device 10 or its part as viewed from different directions. The upward, downward, leftward, rightward, forward, and backward directions to be used in the following description are denoted by respective symbols U, D, L, R, F, and B in FIGS. 3, 4, and 7 (the leftward direction L and the rightward direction R are as viewed from the back side).

The frame 21 includes a frame main body 21a in which a pair of plate-like members are spaced from each other and portions of the plate-like members are connected to each other, a base portion 21b to which the frame main body 21a is fixed, a frame bottom portion 21c which is disposed at a low position in the frame main body 21a and provided with the support portion 22 which is disposed at a press-fitting position, and a frame top portion 21d which is disposed at the top of the frame main body 21a and provided with a pressing mechanism 30.

The support portion 22 is fixed to the frame bottom portion 21c and defines a press-fitting position. The support portion 22 includes a bottom end support portion 22a which supports the bottom end of the rotor shaft B so that it is not movable and a press-fitting holding mechanism 22b which holds the rotor shaft B (supported by the bottom end support portion 22a) so that its axis is parallel with the press-fitting direction. The bottom end of the rotor shaft B is brought into contact with the bottom end support portion 22a, whereby the bottom end support portion 22a determines one position (lower position) of the rotor shaft B in the press-fitting direction (top-bottom direction in FIG. 3) and restricts movement of the rotor shaft B. The press-fitting mechanism 22b includes a holding mechanism 22b1 which comes into contact with horizontal peripheral portions, perpendicular to the axis of the rotor shaft B, and holds the rotor shaft B and a holding drive portion 22*b*2 for moving the holding mechanism 22*b*1 to a holding position and a holding cancellation position.

In the embodiment, the shaft portion B1 of the rotor shaft B is mounted on and held by the support portion 22, whereby the rotor shaft B is supported at the press-fitting position while keeping a press-fit posture. More specifically, the rotor shaft B is supported by the support portion 22 in a state that the impeller A is press-fitted with the rotor shaft B at the tentative press-fitting position.

The frame top portion 21*d* is provided with the pressing mechanism 30. FIG. 4 is a perspective view showing the pressing mechanism 30. As shown in FIG. 4, the pressing mechanism 30 has a press-fitting drive portion 30*a* (see FIG. 3), a movable portion 31, and a press-fitting tool 32. The pressing mechanism 30 includes a pressure detecting means (not shown) for detecting a pressure state at the time of press fitting. The movable portion 31 is a rod-shaped member that extends in the press-fitting direction and has a prescribed length. The press-fitting drive portion 30*a* is attached and fixed to the frame top portion 21*d* so as to be able to move the movable portion 31 in the press-fitting direction. The movable portion 31 moves the press-fitting tool 32 between a press-fitting operation position where is set on one side in the press-fitting direction and a press-fitting standby position that is set over the press-fitting operation position by operation of the press-fitting drive portion 30*a*.

The pressing mechanism 30 can move the movable portion 31 in the top-bottom direction. Attached to the movable portion 31, the press-fitting tool 32 is moved in the top-bottom direction together with the movable portion 31. The pressing mechanism 30 monitors, by means of the pressure detecting means, a pressure state during a press-fitting operation of the movable portion 31 being driven by the press-fitting drive portion 30*a*.

The press-fitting tool 32 has a pressing portion 33, restriction portions 34, and a position setting mechanism 40. The pressing portion 33 includes a pressing surface 33*a* to come into contact with the top surface A2 of the impeller A. When the press-fitting tool 32 is moved in the pressing direction (press-fitting direction), the pressing surface 33*a* of the pressing portion 33 comes into contact with the impeller A (press-fitting component A). When the pressing surface 33*a* is moved in the pressing direction in a state that the pressing surface 33*a* is in contact with the impeller A, the impeller A is moved to a pressing completion position. In the embodiment, the pressing surface 33*a* comes into contact with the top surface A2 of the impeller A and pushes and moves it in the pressing direction, whereby the impeller A is moved to the pressing completion position.

When the press-fitting tool 32 is moved in the pressing direction, a restriction surface 34*a* of one of the restriction portions 34 comes into contact with the rotor shaft B (press-fitting target component B) and its movement in the press-fitting direction is thereby restricted. In the embodiment, when the press-fitting tool 32 is moved in the pressing direction, the restriction surface 34*a* comes into contact with the top surface B4 of the shaft portion B1 of the rotor shaft B, whereby movement of the rotor shaft B in the press-fitting direction of the rotary shaft B is restricted.

The position setting mechanism 40 sets a positional relationship between a position of the pressing surface 33*a* of the pressing portion 33 in the press-fitting direction and a position of the restriction surface 34*a* of one of the restriction portions 34 in the press-fitting direction according to the impeller A (press-fitting component A) and the rotor shaft B (press-fitting target component B). In the embodiment, the press-fitting direction is the vertical direction.

The position setting mechanism 40 will be described below in detail. The position setting mechanism 40 has a press-fitting jig 50 and a jig support unit 100.

Figure 5:
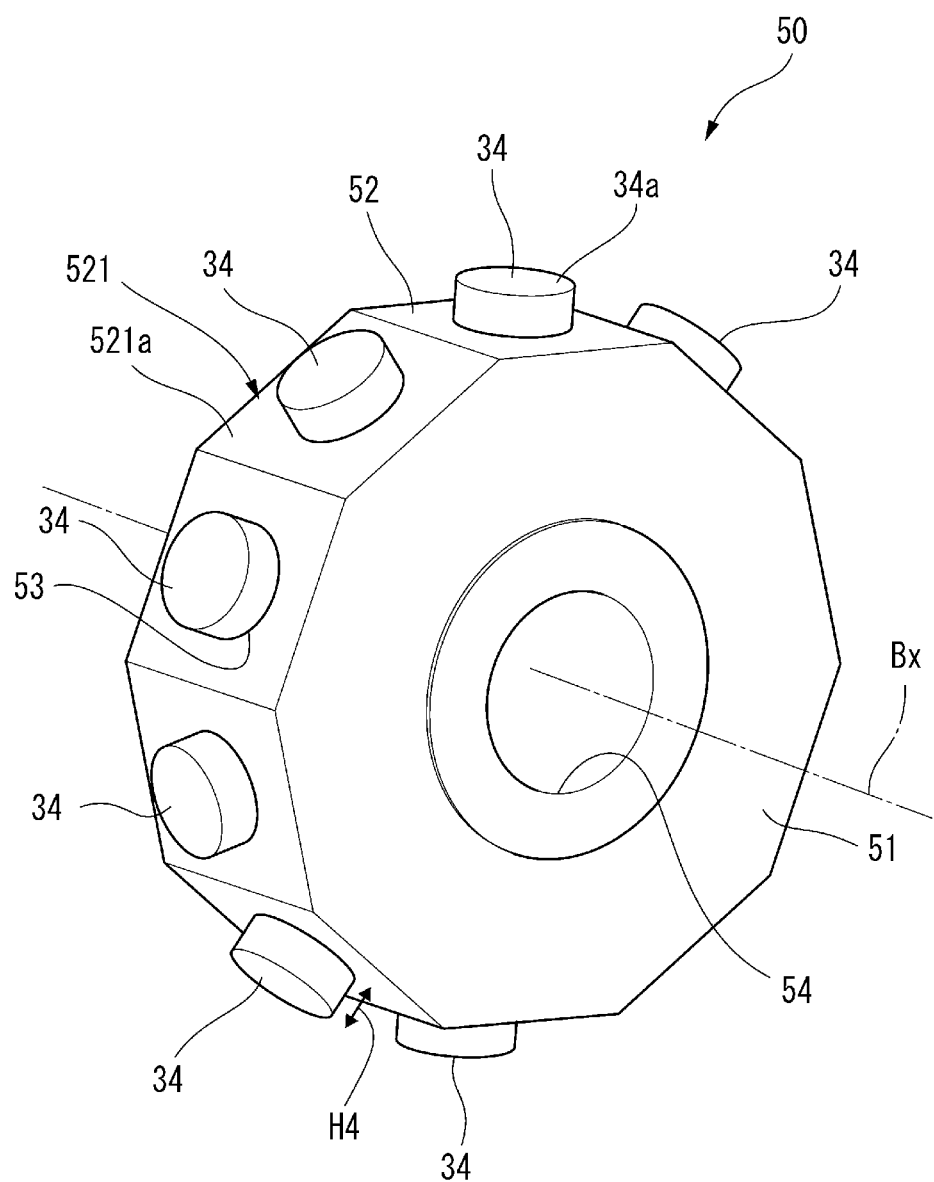
FIG. 5 is a perspective view showing a press-fitting jig.

FIG. 5 is a perspective view showing the press-fitting jig 50. As shown in FIG. 5, in the press-fitting jig 50, plural restriction portions 34 are arranged at prescribed intervals and a movable body that is provided with the plural restriction portions 34 is provided so as to be movable in their arrangement direction. The press-fitting jig 50 employed in the embodiment has an axis that extends in a prescribed direction and is provided so as to be rotatable about the axis. The press-fitting jig 50 has a main body 51 having a prescribed length in the axial direction and shaped like a regular polygonal prism and an arrangement portion 52 that constitutes an outer circumferential surface of the main body 51. In the embodiment, the main body 51 is shaped like a regular decagonal prism.

The arrangement portion 52 constitutes the entire outer circumferential surface of the main body 51. The plural (an even number of) restriction portions 34 are arranged at regular intervals. The main body 51 is a member that is supported so as to be movable with respect to the pressing portion 33. In the embodiment, the center axis of the regular polygonal prism coincides with a rotation axis Bx. The press-fitting jig 50 is attached the press-fitting device 10 in a posture that the rotation axis Bx extends in a horizontal direction.

As shown in FIG. 4, the main body 51 is supported rotatably by the press-fitting tool 32. The arrangement portion 52 has plural flat surfaces 521 that are parallel with the rotation axis Bx. The flat surfaces 521 are arranged at prescribed intervals in the circumferential direction around the rotation axis Bx of the main body 51. As shown in FIG. 5, each flat surface 521 includes a maintaining/restricting portion 521*a* that is formed around a mounting portion 53 in which a restriction portion 34 is inserted and is used in restricting and maintaining rotation of the main body 51 which is supported rotatably. In the embodiment, the mounting portion 53 includes a hole that is formed in the flat surface 521 and a surface on which the associated restriction portion 34 is seated when it is attached. The mounting portion 53 is located at the center of the flat surface 521 and the maintaining/restricting portion 521*a* is formed around it. Each mounting portion 53 is coaxial with another mounting portion 53 that is line-symmetrical with the former mounting portion 53 when viewed from a point on the axis of the main body 51.

The main body 51 is provided with a rotation axis portion 54 that is formed with an insertion hole that penetrates through it at the center in the horizontal direction, that is, along the rotation axis Bx. A switching shaft portion 82 (described later) is inserted through and fixed to the insertion hole formed in the rotation axis portion 54. When the switching shaft portion 82 is rotated, the press-fitting jig 50 is also rotated about the rotation axis Bx which extends in the horizontal direction (front-rear direction shown in FIG. 3).

Radial projection heights H4 of the respective restriction portions 34 which project in radial directions from the arrangement portion 52 are different from each other. One of the plural restriction portions 34 is selected according to a combination of an impeller A (press-fitting component A) and a rotor shaft B (press-fitting target component B), moved to the contact position by rotating the main body 51, and stopped (set) there.

Figure 6:
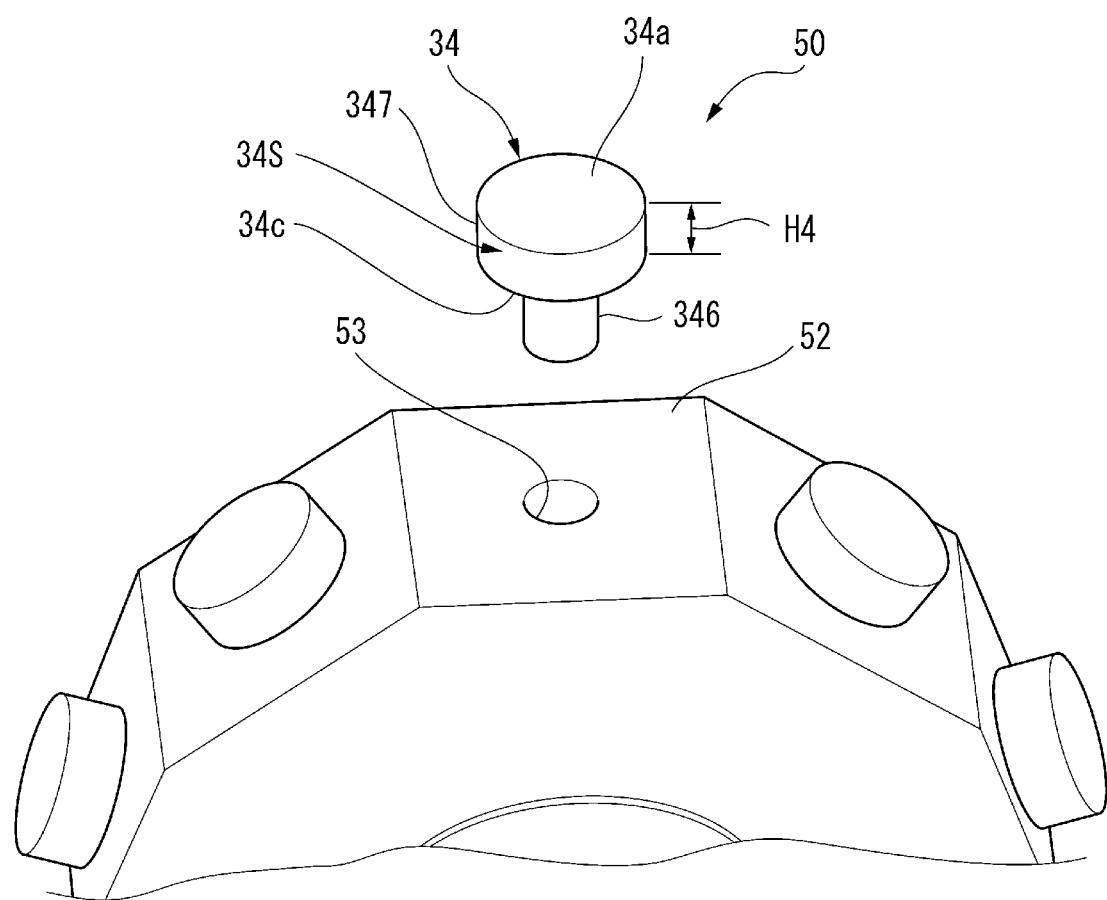
FIG. 6 is a perspective view showing how each restriction portion is attached to a main body of the press-fitting jig.

FIG. 6 is a perspective view showing how each restriction portion 34 is attached to the main body 51 of the press-fitting jig 50. As shown in FIG. 6, the arrangement portion 52 is formed with a mounting portion 53 into which a restriction portion 34 is inserted. The restriction portion 34 is provided with a cylindrical height adjustment shaft portion 347 and an attachment leg (engagement portion 346) that is smaller in diameter than the height adjustment shaft portion 347 and is inserted in the mounting portion 53. The height adjustment shaft portion 347 has a restriction surface 34a to come into contact with the top surface B4 of the rotor shaft B, a seating surface 34c having a surface that is parallel with the restriction surface 34a, and an outer circumferential surface 34S located between the restriction surface 34a and the seating surface 34c. The lengths of the height adjustment shaft portions 347 in their axial directions (i.e., the directions of the center axes of the cylinders) of the respective restriction portions 34 are different from each other. In the following description, the axial length H4 of each height adjustment shaft portion 347 from the seating surface 34c to the restriction surface 34a may be referred to as a "projection height H4."

The engagement portion 346 has a prescribed diameter and a prescribed length by which it projects in the axial direction from the seating surface 34c that is to come into contact with the associated flat surface 521 when each restriction portion 34 is attached to the mounting portion 53. Each restriction portion 34 is attached to the main body 51 of the press-fitting jig 50 detachably by engaging the engagement portion 346 of the restriction portion 34 with the hole of the associated mounting portion 53 of the press-fitting jig 50.

Returning to FIG. 4, the press-fitting device 10 includes a rotation mechanism 80 for rotating the press-fitting jig 50 about the rotation axis Bx and a switching drive source 8 that is fixed to the frame 21 and causes the rotation mechanism 80 to operate. In the press-fitting device 10, when the rotation mechanism 80 operates, a desired one of the plural restriction portions 34 of the press-fitting jig 50 is selected and the restriction surface 34a of the selected restriction portion 34 is placed at such a position as to be able to touch the rotor shaft B (press-fitting target component B).

The rotation mechanism 80 has a switching drive portion 81 which is rotated by the switching drive source 8, the switching shaft portion 82 to which the main body 51 of the press-fitting jig 50 is fixed and which extends along the rotation axis Bx of the press-fitting jig 50, and a drive power transmission portion 83 for transmitting rotational power of the switching drive portion 81 to the switching shaft portion 82.

The frame 21 includes a switching fixing member 21e to which the switching drive source 8 is fixed. The switching drive source 8 is a motor for generating rotational torque. The switching drive portion 81 is a shaft portion that is rotated about a rotation axis Cx which extends in a horizontal direction (front-rear direction shown in FIG. 4) and is coupled to an output shaft of the switching drive source 8. The rotation axis Cx is set parallel with the rotation axis Bx of the press-fitting jig 50.

The drive power transmission portion 83 includes a first magnet body 831 which rotates together with the switching drive portion 81 and a second magnet body 832 which rotates in link with the rotation of the first magnet body 831 and transmits rotational power to the switching shaft portion 82. The first magnet body 831 is a cylindrical member in which N poles and S poles are arranged alternately in the circumferential direction around its central axis. The first magnet body 831 is provided at a tip portion of the switching drive portion 81 and is rotated together with the switching drive portion 81. In the embodiment, the first magnet body 831 is fixed to the tip portion of the switching drive portion 81 in such a manner that its center is located on the rotation axis Cx of the switching drive portion 81. The first magnet body 831 is disposed at a position corresponding to a press-fitting standby position where the press-fitting tool 32 stands by.

The second magnet body 832 is a cylindrical member in which N poles and S poles are arranged alternately in the circumferential direction around its central axis. The second magnet body 832 is provided at a tip portion of the switching shaft portion 82 and is rotated as the first magnet body 831 rotates. In the embodiment, the second magnet body 832 is fixed to the tip portion of the switching shaft portion 82 in such a manner that its center is located on the rotation axis Bx that coincides with the center axis of the switching shaft portion 82. The second magnet body 832 is reciprocated in the press-fitting direction together with the press-fitting tool 32.

The first magnet body 831 which is provided on the switching drive portion 81 and the second magnet body 832 which is provided on the switching shaft portion 82 are arranged adjoining each other in such a range that a magnetic pole of one polarity of one of the first magnet body 831 and the second magnet body 832 attracts a magnetic pole of other polarity of the other of the first magnet body 831 and the second magnet body 832. Thus, the drive power transmission portion 83 can transmit rotational power of the switching drive source 8 to the switching shaft portion 82 as an N pole (or S pole) of the first magnet body 831 attracts and then repels an S pole (or N pole) of the second magnet body 832. That is, when the switching drive portion 81 is rotated by causing the switching drive source 8 to operate, rotational power of the switching drive portion 81 is transmitted to the press-fitting jig 50 via the drive power transmission portion 83 and the press-fitting jig 50 is rotated. Since drive power is transmitted through magnetic force, drive power of the first magnet body 831 can be transmitted to the second magnet body 832 through the magnetic force even if a gap exists between them.

In the embodiment, the switching shaft portion 82 is connected to the main body 51 of the press-fitting jig 50. Since the press-fitting jig 50 is provided on the movable portion 31, the switching shaft portion 82 can move in the top-bottom direction with respect to the frame 21. That is, as the press-fitting tool 32 moves in the top-bottom direction, the first magnet body 831 and the second magnet body 832 of the drive power transmission portion 83 come closer to or go away from each other. More specifically, when the press-fitting tool 32 is located at the press-fitting standby position, the first magnet body 831 and the second magnet body 832 are set adjoining each other. When the press-fitting jig 50 is moved downward from this state, the press-fitting jig 50 is made rotatable. When the press-fitting jig 50 is moved upward, rotation of the press-fitting jig 50 comes to be restricted.

Next, a mechanism for moving the press-fitting jig 50 in the top-bottom direction with respect to a press-fitting movable body 90 will be described with reference to FIGS. 4 and 7. FIG. 7 is a perspective view as viewed from the side that is opposite to the viewing side of FIG. 4 and includes the press-fitting jig 50 and the pressing mechanism 30. As shown in FIGS. 4 and 7, the pressing mechanism 30 has the movable portion 31 which is moved to the press-fitting standby position and the press-fitting operation position that are set in the press-fitting direction when a press-fitting operation is performed. The press-fitting tool 32 has the press-fitting movable body 90 which is connected to the movable portion 31 and is moved together with it.

The press-fitting movable body 90 includes a connection portion 91, a pair of pressing link portions 90b (see FIG. 4), the pressing portion 33, a drive support portion 90a, and a guide portion 92. The connection portion 91 is provided on one side of the press-fitting movable body 90 in the press-fitting direction and connected to the movable portion 31. The pair of pressing link portions 90b are spaced from each other and project downward by a prescribed length from a bottom end portion of the connection portion 91. The pressing portion 33 is provided on the other side of the press-fitting movable body 90 in the press-fitting direction at tip portions of the pair of pressing link portions 90b. The drive support portion 90a is provided on the connection portion 91 and supports a jig support unit 100 (described later). The guide portion 92 guides the jig support unit 100 (described later) in the press-fitting direction.

In the embodiment, the press-fitting movable body 90 is a cuboid member. The connection portion 91 is a top portion of the press-fitting movable body 90 and the pressing portion 33 is connected to a bottom portion of the press-fitting movable body 90. An elevation drive portion 102 for moving the jig support unit 100 in the press-fitting direction is connected to the drive support portion 90a. The guide portion 92 is a projection strip that is provided on a side surface of the press-fitting movable body 90 and extends in the top-bottom direction.

A pressing surface 33a of the pressing portion 33 of the press-fitting movable body 90 is formed with a hole 96 at such a position that it faces the restriction surface 34a (bottom surface) of one selected restriction portion 34 that is set at the restriction position. Thus, when the press-fitting movable body 90 is lowered, the pressing surface 33a of the pressing portion 33 that is provided as the bottom portion of the press-fitting movable body 90 pushes the impeller A and the shaft portion B1 of the rotor shaft B comes into contact with the restriction surface 34a that is set at the restriction position through the hole 96 of the pressing surface 33a. A circumferential wall surface 33b (see FIGS. 8 and 9) of the hole 96 of the pressing portion 33 restricts movement of the rotor shaft B in a radial direction that is perpendicular to the center axis of the rotor shaft B when the rotor shaft B is in contact with the restriction surface 34a.

The jig support unit 100 of the position setting mechanism 40 is attached to the press-fitting movable body 90 so as to be movable with respect to it in the press-fitting direction. The jig support unit 100 has a jig support portion 60 which supports the press-fitting jig 50 rotatably, a guide engagement portion 101, and the elevation drive portion 102. The guide engagement portion 101 is engaged with the guide portion 92 of the press-fitting movable body 90 and guides the jig support portion 60 in the top-bottom direction with respect to the press-fitting movable body 90.

In the illustrated example, the jig support portion 60 has a pair of support portions 60a that are adjacent to a pair of pressing link portions 90b (that provide a pair of side surfaces of the press-fitting movable body 90), respectively, and a connection portion 60b which connect the pair of support portions 60a. The pair of support portions 60a of the jig support portion 60 are equipped with a pair of switching support portions 60c, respectively, which support the switching shaft portion 82 rotatably. The switching support portions 60c are provided in the respective support portions 60a. The switching support portions 60c employed in the embodiment constitute respective bearing portions. The guide engagement portion 101 is a rail portion that is provided in the connection portion 60b (opposed to the guide portion 92) so as to extend in the top-bottom direction.

The elevation drive portion 102 is an actuator for moving the jig support unit 100 in the top-bottom direction with respect to the press-fitting movable body 90. The elevation drive portion 102 includes an elevation moving portion 102b which is connected to the drive support portion 90a and an elevation operation portion 102a which causes the elevation moving portion 102b to operate. The elevation moving portion 102b is formed so as to be able to protrude from and retract into the elevation operation portion 102a and is connected to the drive support portion 90a. The elevation operation portion 102a is fixed to the connection portion 60b so that the elevation moving portion 102b can protrude from and retract into the elevation operation portion 102a in the press-fitting direction. When operating to cause the elevation moving portion 102b to protrude or retract, the elevation operation portion 102a comes closer to or goes away from the drive support portion 90a.

When the elevation drive portion 102 operates, the jig support unit 100 is moved in the top-bottom direction with respect to the press-fitting movable body 90 together with the elevation operation portion 102a because of the engagement between the guide portion 92 and the guide engagement portion 101. When the jig support unit 100 is moved, the press-fitting jig 50 is moved between a rotary movement possible position and a rotary movement restricted position that are set in the press-fitting movable body 90. When having moved to the rotary movement possible position, the press-fitting jig 50 can be rotated by causing the switching drive source 8 to operate in a state that the first magnet body 831 and the second magnet body 832 are set close to each other.

Figure 8:
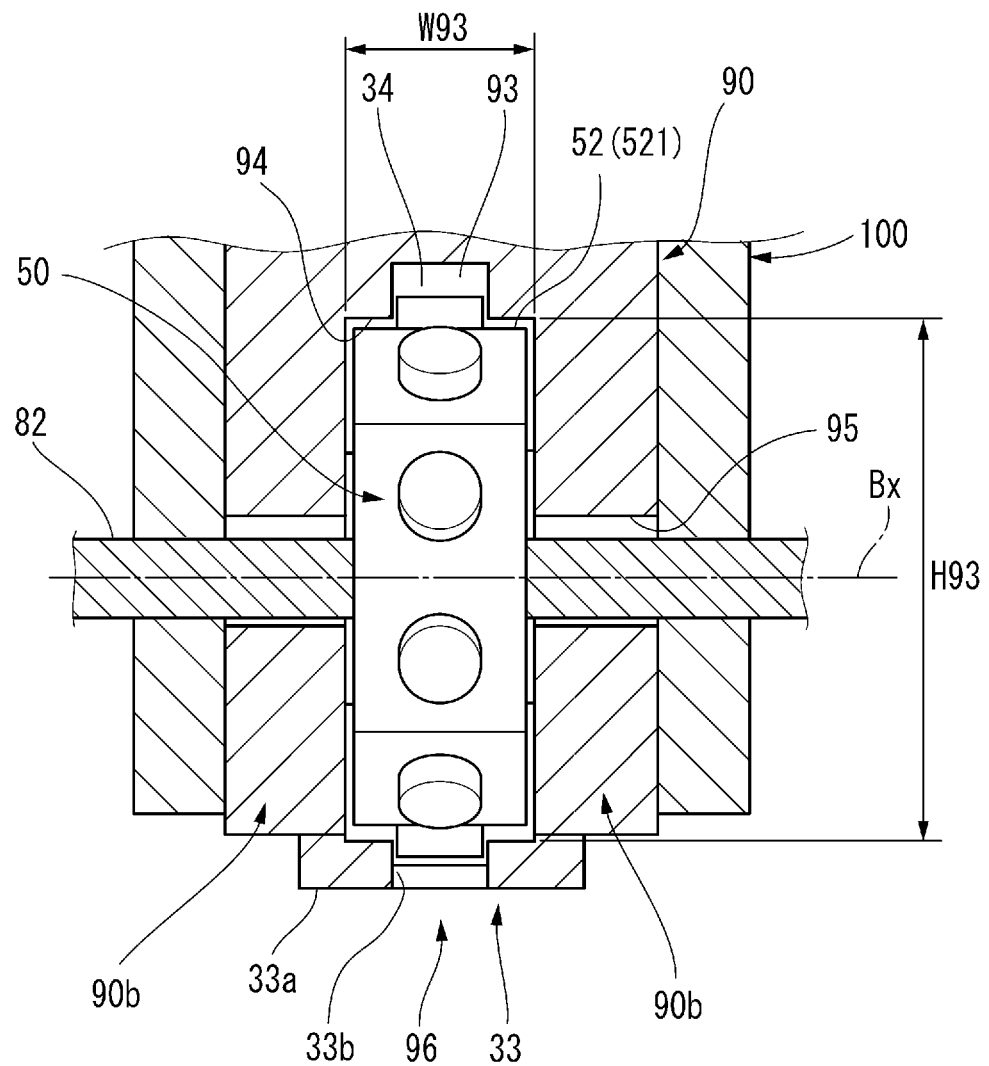
FIG. 8 is basically a sectional view showing a state that the press-fitting jig is rotatable.
Figure 9:
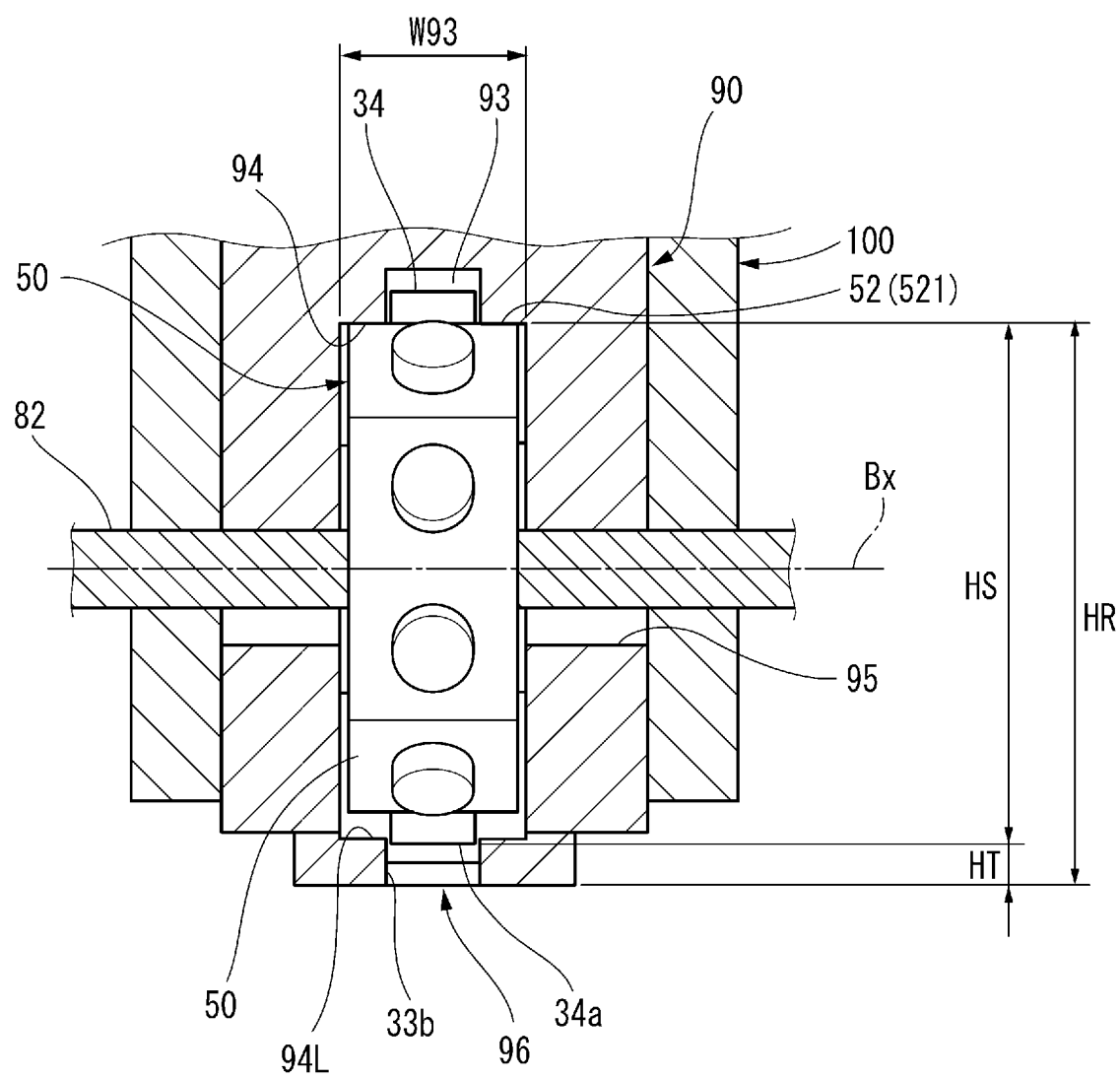
FIG. 9 is basically a sectional view showing a state that the press-fitting jig is not rotatable.

Next, a mechanism for placing one desired restriction portion 34 at such a position as to be able to touch the rotor shaft B (press-fitting target component B) will be described with reference to FIGS. 8 and 9. FIG. 8 shows a state that the press-fitting jig 50 is rotatable. FIG. 9 shows a state that the press-fitting jig 50 is not rotatable. To facilitate understanding of the structure, FIGS. 8 and 9 include sectional views of the press-fitting movable body 90 and the jig support unit 100 and a side view of the press-fitting jig 50.

As shown in FIG. 8, a housing portion 93 to house the press-fitting jig 50 is formed inside the press-fitting movable body 90. The housing portion 93 is formed by the pair of pressing link portions 90b which are located on the two respective sides of the housing portion 93 and opposed to each other, the pressing portion 33 which is located under the housing portion 93, and the connection portion 91 which is located over the housing portion 93. The connection portion 91 is provided with a rotation stop surface 94 for restricting rotation of the press-fitting jig 50 by coming into contact with a flat surface 521 of the arrangement portion 52 of the press-fitting jig 50.

Furthermore, the pair of pressing link portions 90b which are provided on the two respective sides of the housing portion 93 are formed with respective insertion holes 95 through which the switching shaft portion 82 is inserted and which allow movement of the switching shaft portion 82 in the press-fitting direction. The insertion holes 95 are elongated holes having a prescribed length in the top-bottom direction.

A height dimension H93 of the housing portion 93 is larger than the maximum diameter of the main body 51 and is determined by the rotation stop surface 94 that defines one end, in the height direction, of the housing portion 93 and a pressing top surface 94L (of the pressing portion 33) that is the top surface of the pressing portion 33 and defines the other end, in the height direction, of the housing portion 93. A width dimension W93 of the housing portion 93 is larger than the width of the main body 51 and is determined by the confronting surfaces, defining the housing portion 93 from the two respective sides, of the pair of pressing link portions 90b.

As shown in FIG. 8, when the jig support unit 100 is moved downward with respect to the press-fitting movable body 90 and the press-fitting jig 50 is placed at the center of the housing portion 93 in the height direction, a flat surface 521, located at such a position as to be opposed to the rotation stop surface 94, of the press-fitting jig 50 is separated from the rotation stop surface 94 and the rotation unable state of the press-fitting jig 50 is canceled, that is, it is made rotatable. Since the press-fitting jig 50 is made rotatable, a desired one of the plural restriction portions 34 which are provided on the circumferential surface of the press-fitting jig 50 can be selected and positioned at the position where it is opposed to the pressing portion 33.

As shown in FIG. 9, when the jig support unit 100 is moved upward with respect to the press-fitting movable body 90 and the flat surface 521, located at such a position as to be opposed to the rotation stop surface 94, of the press-fitting jig 50 comes into contact with the rotation stop surface 94, the press-fitting jig 50 is made not rotatable. When the movable portion 31 is lowered in the state that the flat surface 521 of the press-fitting jig 50 is in contact with the rotation stop surface 94, the restriction portion 34, opposed to the pressing portion 33, of the press-fitting jig 50 comes into contact with the rotor shaft B (press-fitting target component B). The rotation stop surface 94 can receive a reaction force that the press-fitting jig 50 receives from the rotor shaft B.

That is, when the press-fitting jig 50 is rotated so that a selected restriction portion 34 that is desired to be brought into contact with the rotor shaft B is located at the lowest position and the press-fitting jig 50 is moved upward in this state via the jig support unit 100, the selected restriction portion 34 is held in such a state as to be able to touch the rotor shaft B. In this manner, the position of the restriction surface 34a with respect to the rotation stop surface 94 can be selected from plural prescribed positions and thus set.

Returning to FIG. 7, the production device 1 according to the embodiment includes a mechanism that makes it possible to easily judge which one of the restriction portions 34 has been selected from the plural restriction portions 34. The position setting mechanism 40 has a discrimination body 41 for discriminating among the restriction portions 34 of the press-fitting jig 50. The discrimination body 41 has plural discrimination portions 42 corresponding to the respective restriction portions 34 of the press-fitting jig 50. The press-fitting device 10 includes a detection unit 43 capable of detecting each discrimination portion 42.

The discrimination body 41 is provided on the switching shaft portion 82 which supports the press-fitting jig 50. In the illustrated example, the discrimination body 41 is a disc-shaped member having a prescribed diameter. The discrimination body 41 is fixed to an end portion, opposite to an end portion provided with the second magnetic body 832, of the switching shaft portion 82 in such a manner that the center axis of the discrimination body 41 coincides with that of the switching shaft portion 82. That is, the discrimination body 41 rotates together with the press-fitting jig 50.

The plural discrimination portions 42 are provided in the same number as the plural restriction portions 34 of the press-fitting jig 50. The plural discrimination portions 42 have different pieces of discrimination information. For example, the discrimination portions 42 may be different marks or different pieces of magnetic information. The detection unit 43 may be a camera for taking an image of a discrimination portion 42 or a magnetic sensor for reading out magnetic information. In the embodiment, the plural discrimination portions 42 are discriminated from each other based on combinations of the number and positions of holes that are formed at prescribed intervals at respective positions where a radial line extending from the center of the discrimination body 41 perpendicularly to its center axis crosses circles that are formed at the same interval.

The detection unit 43 is fixed to the frame 21. The detection unit 43 includes a detection portion 43a for detecting a discrimination portion 42 and a detection portion attaching portion 43b which fixes the detection portion 43a to the frame 21. The detection portion 43a detects a discrimination portion 42 when the press-fitting tool 32 is located at the press-fitting standby position. More specifically, the detection portion 43a is disposed so as to be able to detect one particular discrimination portion 42 in a state that the press-fitting tool 32 is located at the press-fitting standby position and the press-fitting jig 50 is rotatable. In the embodiment, settings are made so that when a selected restriction portion 34 is located at such a position as to be opposed to the pressing portion 33 the corresponding discrimination portion 42 is detected by the detection unit 43. An optical or magnetic rotary encoder may be employed as the detection mechanism consisting of the discrimination body 41, the discrimination portions 42, and the detection unit 43 to perform discrimination using a numerical value.

The press-fitting device 10 according to the embodiment is further equipped with a pressure sensor (not shown) capable of measuring a pressure that the movable portion 31 receives from the working target. The pressure sensor may be either provided in the connection portion 91 or incorporated in a press-fitting movement portion 31a. The pressure sensor outputs information relating to a measured pressure to the control portion 7.

<Press-Fitting Method and Production Method>

Next, a press-fitting method using the press-fitting device 10 according to the embodiment and a production method for a press-fit product C using it will be described with reference to FIGS. 10A-10D. FIGS. 10A-10D are diagrams schematically showing positional relationships between the impeller A (press-fitting component A), the rotor shaft B (press-fitting target component B), and the press-fitting tool 32 in respective steps. In FIGS. 10A-10D, the impeller A (press-fitting component A) is drawn as a cuboid component and the jig support unit 100 is omitted.

The production method according to the embodiment includes:
 a preparing step of preparing a press-fitting component A and a press-fitting target component B; and
 a press-fitting step of press-fitting one of the press-fitting component A and the press-fitting target component B into or with the other by moving the one of the press-fitting component A and the press-fitting target component B in the press-fitting direction by means of the press-fitting tool 32.

The preparing step has a setting step of setting the press-fitting component A or the press-fitting target component B in the measuring portion ME of the production device 1. The preparing step includes a second measuring step of measuring a dimension of the press-fitting component A after the setting step and a first measuring step of measuring a dimension of the press-fitting target component B. In the embodiment, the first measuring step is executed by the first measuring portion 2 which is included in the measuring portion ME and the second measuring step is executed by the second measuring portion 3 which is included in the measuring portion ME.

The press-fitting step press-fits the press-fitting component A with the press-fitting target component B by the press-fitting portion PR of the production device 1. The press-fitting step includes a tentative press-fitting step of press-fitting the press-fitting component A with the press-fitting target component B to a tentative press-fitting position of the press-fitting target component B and a press-fitting step of press-fitting the press-fitting component A being in a tentative press-fit state with the press-fitting target component B to a press-fitting completion position. In the embodiment, the tentative press-fitting step, which is executed by the by the tentative press-fitting portion 4 of the press-fitting portion PR, press-fits the press-fitting component A with the press-fitting target component B tentatively to establish a tentative press-fit state in which the press-fitting component A is integrated with the press-fitting target component B tentatively (see states of the press-fitting component A and the press-fitting target component B shown in FIG. 10A).

As shown in FIG. 10B, the press-fitting step, which is executed by the press-fitting portion 5 of the press-fitting portion PR, press-fits the press-fitting component A being in a tentative press-fit state with the press-fitting target component B to the press-fitting completion position. The press-fitting step adjusts the press-fitting interval dimension HT (see FIG. 9) in the press-fitting direction between the pressing surface 33a of the pressing portion 33 and the restriction surface 34a of a restriction portion 34 so as to obtain a press-fitting stop position of the press-fitting component A that is set in the press-fitting target component B according to related dimensions of the press-fitting component A and the press-fitting target component B (press-fitting stop position adjusting step).

In the embodiment, first, the control portion 7 selects one proper restriction portion 34 from the plural restriction portions 34 based on a first dimension H1 and a second dimension H2. Then the control portion 7 adjusts the press-fitting interval dimension HT by rotating the press-fitting jig 50 so that the selected restriction portion 34 is placed at a confronting position where it is opposed to the pressing portion 33 when the press-fitting tool 32 is located at the press-fitting standby position that is spaced upward from the press-fitting component A that is set over the support portion 22. The control portion 7 moves the press-fitting jig 50 upward relative to the press-fitting movable body 90 in a state that the selected restriction portion 34 is located at the confronting position where it is opposed to the pressing portion 33. As a result, the arrangement portion 52 of the press-fitting jig 50 comes into contact with the rotation stop surface 94. This will be described in detail later.

Figure 10A:
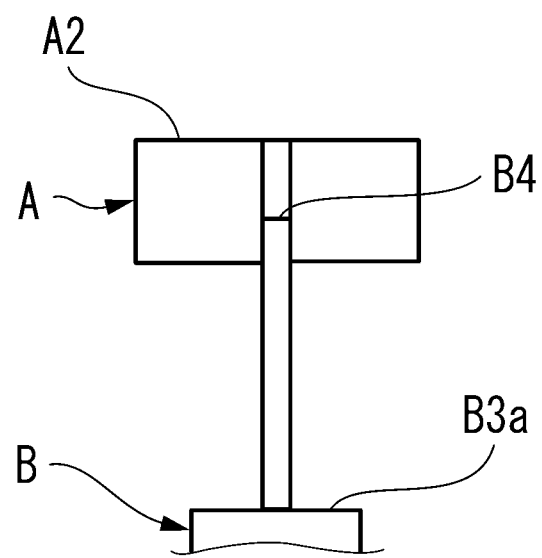
FIG. 10A is a diagram schematically showing positional relationships between a press-fitting component, a press-fitting target component, and the press-fitting tool in respective steps.
Figure 10C:
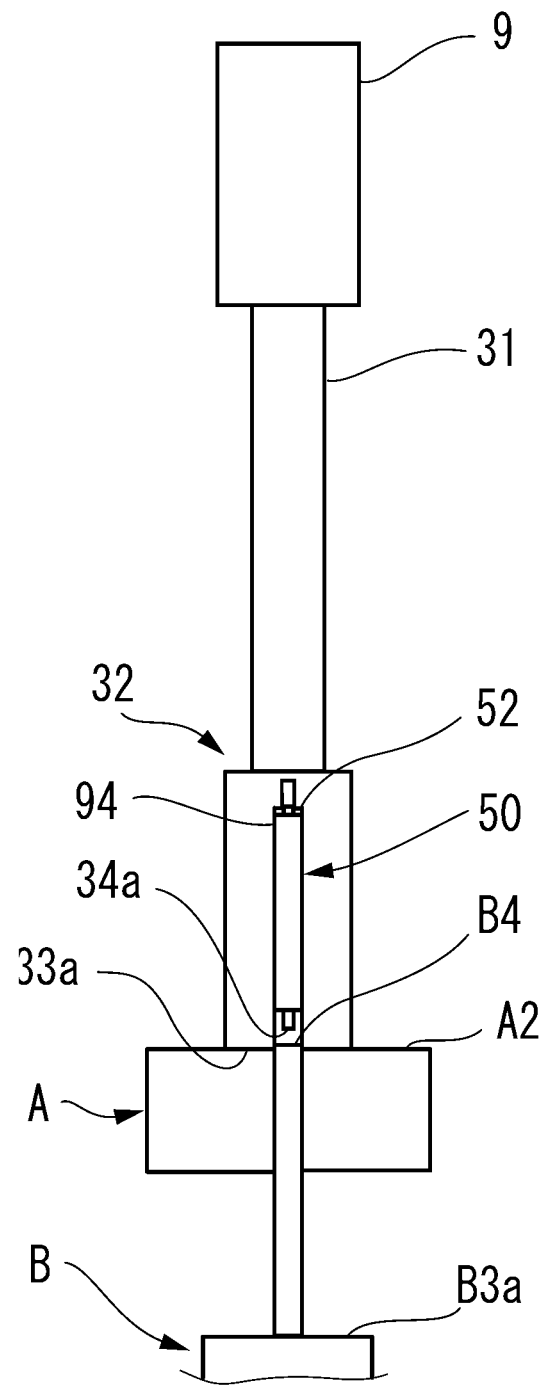
FIG. 10C is a diagram schematically showing positional relationships between a press-fitting component, a press-fitting target component, and the press-fitting tool in respective steps.

Furthermore, as shown in FIG. 10C, the press-fitting component A is press-fitted with the press-fitting target component B (press-fitting step). The control portion 7 lowers the movable portion 31 so that the pressing portion 33 comes into contact with the top surface A2 of the press-fitting component A. In the illustrated example, since the pressing surface 33a of the pressing portion 33 is located under the restriction surface 34a of the restriction portion 34, the pressing surface 33a comes into contact with the top surface A2 of the press-fitting component A before the restriction surface 34a comes into contact with the top surface B4 of the press-fitting target component B. The control portion 7 continues to lower the movable portion 31 until the restriction surface 34a comes into contact with the top surface B4 of the press-fitting target component B and causes the pressing surface 33a to continue to press-fit the press-fitting component A with the press-fitting target component B.

Figure 10D:
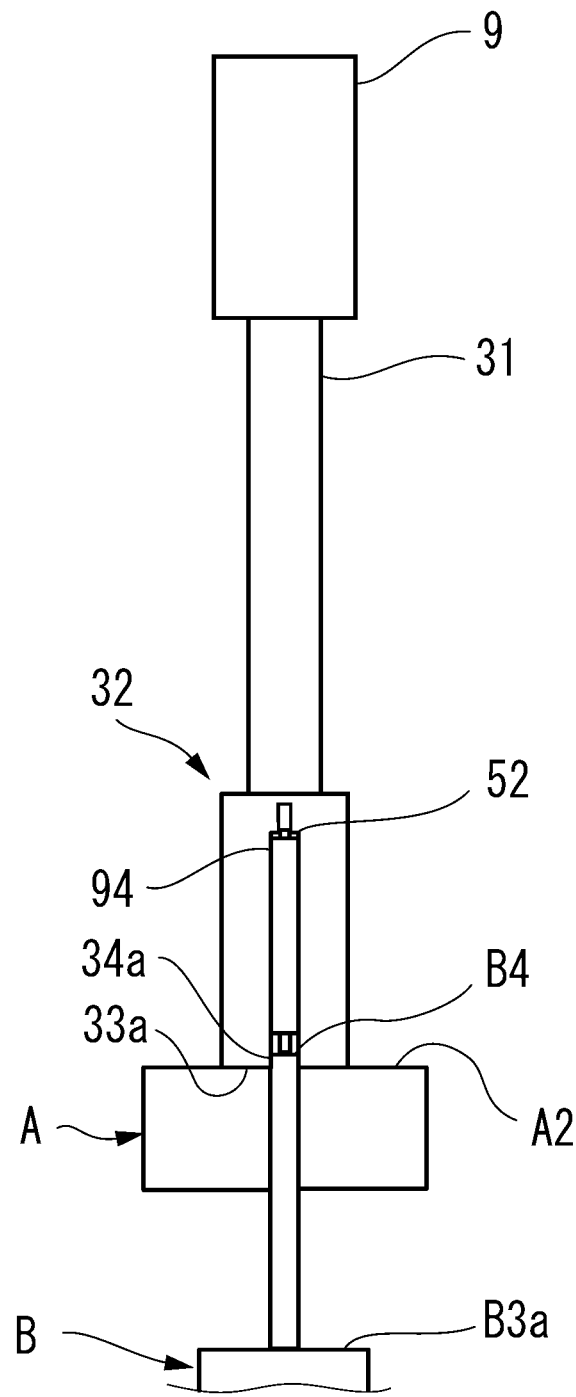
FIG. 10D is a diagram schematically showing positional relationships between a press-fitting component, a press-fitting target component, and the press-fitting tool in respective steps.

Still further, as shown in FIG. 10D, the restriction portion 34 comes into contact with the press-fitting target component B, whereupon the press-fitting of the press-fitting component A with the press-fitting target component B is stopped (press-fitting completion step). When detecting that the restriction surface 34a has come into contact with the top surface B4 of the press-fitting target component B, the control portion 7 stops the lowering of the movable portion 31 and stops the operation of press-fitting the press-fitting component A with the press-fitting target component B.

Figure 11:
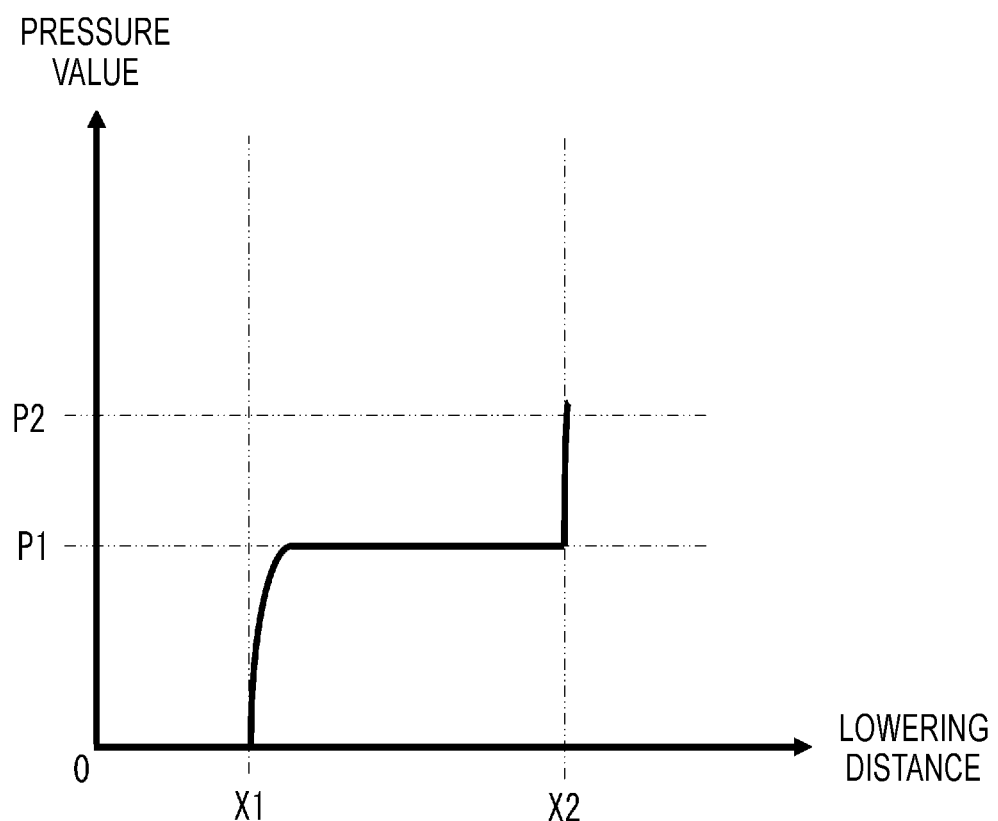
FIG. 11 is a graph showing a variation of an output value of a pressure sensor with respect to the lowering distance of a movable portion.

Incidentally, in the embodiment, the pressing mechanism 30 includes the pressure sensor for measuring a pressure produced by a press-fitting operation of the movable portion 31. FIG. 11 is a graph showing a variation of an output value of the pressure sensor with respect to the lowering distance of the movable portion 31. The horizontal axis of FIG. 11 represents the lowering distance of the movable portion 31 and its vertical axis represents the output value (the pressure value) of the pressure sensor. Symbol X1 on the horizontal axis indicates a contact-to-pressing-surface position (first press-fitting operation position) corresponding to a movement distance (lowering distance) by which the movable portion 31 has moved from the initial position (press-fitting standby position) to such a position that the pressing surface 33a comes into contact with the press-fitting component A. Symbol X2 indicates a contact-to-restriction-surface position (second press-fitting operation position) corresponding to a movement distance (lowering distance) by which the movable portion 31 has moved from the press-fitting standby position to such a position that the restriction surface 34a comes into contact with the press-fitting target component B.

While the movable portion 31 is lowered from the initial position (the lowering distance is equal to 0) to the contact-to-pressing-surface position X1, the pressing surface 33a is not in contact with the top surface A2 of the impeller A and the restriction surface 34a is not in contact with the top surface B4 of the rotor shaft B. In this state, the movable portion 31 (press-fitting tool 32) does not receive any reaction force from the working target and hence the output value of the pressure sensor is equal to 0. As the movable portion 31 is then lowered from the contact-to-pressing-surface position X1 toward the contact-to-restriction-surface position X2, the pressing surface 33a comes to touch the top surface A2 of the impeller A, whereupon the output value of the pressure sensor reaches a firth threshold value P1. As the movable portion 31 is lowered further, the restriction surface 34a comes to touch the top surface B4 of the shaft portion B1 of the rotor shaft B, whereupon the output value of the pressure sensor quickly increases to a second threshold value P2 that is larger than the firth threshold value P1. When the control portion 7 which receives the output value of the pressure sensor judges that the output value of the pressure sensor has reached the second threshold value P2, the control portion 7 stops the lowering of the movable portion 31.

As described above, the press-fitting operation can be stopped when the movable portion 31 has reached the contact-to-restriction-surface position X2 (i.e., the restriction surface 34a has reached the top surface B4 of the shaft portion B1 of the rotor shaft B). Where the firth threshold value P1 (first pressure value) and the second threshold value P2 (second pressure value) are stored in the storage portion 72 of the control portion 7, the control portion 7 can perform pressure monitoring, that is, an operation of comparing an operation pressure value that is output from the pressure sensor in operation and received by the control portion 7 with the first pressure value and the second pressure value.

As described above, the press-fitting method according to the embodiment includes a pressure detecting step of detecting that the pressure acting on the press-fitting tool 32 has reached a preset, prescribed value.

The press-fitting stop position adjusting step shown in FIG. 10C will be described in detail below.

The press-fitting stop position adjusting step includes a press-fitting interval setting step of setting a press-fitting interval dimension HT so that an absolute value of the difference between a preset reference interval dimension Ha to be managed and an actual value of the reference interval dimension Ha of a press-fit product C produced using the press-fitting interval dimension HT becomes smaller than a predetermined allowable error value.

The press-fitting stop position is a stop position of the press-fitting component A that is fitted with the press-fitting target component B and is a position in the press-fitting direction (vertical direction) where the restriction surface 34a has come into contact with the press-fitting target component B.

The press-fitting interval dimension HT is the interval between the pressing surface 33a and the restriction surface 34a, that is, the interval between a press-fitting stop position of the pressing surface 33a and the press-fitting stop position of the restriction surface 34a. As shown in FIG. 9, in the embodiment, the press-fitting interval dimension HT is the difference between a dimension HR from the rotation stop surface 94 to the pressing surface 33a and a dimension HS from one flat surface 521 of the press-fitting jig 50 to the restriction surface 34a of the restriction portion 34 provided on the other flat surface 521 opposed to the pressing portion 33 in a state that the one flat surface 521 of the press-fitting jig 50 is in contact with the rotation stop surface 94.

That is, the press-fitting stop position is not changed by movement of the movable portion 31 in the top-bottom direction. The press-fitting interval dimension HT does not vary when the movable portion 31 is moved in the top-bottom direction, either. In the embodiment, the press-fitting stop position and the press-fitting interval dimension HT change when one of the plural restriction portions 34 having different heights of the press-fitting jig 50 is selected as a restriction portion 34 having a restriction surface 34a.

In the above-described production device 1, the pressing surface 33a is the lower end surface of the press-fitting movable body 90 and is moved together with the movable portion 31. The pressing surface 33a and the movable portion 31 are always moved together. Thus, the interval between the rotation stop surface 94 (reference surface) and the pressing surface 33a is always the same.

On the other hand, the plural restriction portions 34 are provided on the press-fitting jig 50 which is supported rotatably by the press-fitting movable body 90. The restriction surface 34a of selected one of the plural restriction portions 34 is placed so as to be opposed to the pressing portion 33. In this manner, the press-fitting stop position can be changed by switching the restriction surface 34a to be opposed to the pressing portion 33 to one having a different height by rotating the press-fitting jig 50. That is, the interval between the rotation stop surface 94 (reference surface) and the restriction surface 34a opposed to the pressing portion 33 varies depending on which restriction surface 34a is selected.

Thus, the press-fitting interval dimension HT which is the interval between the pressing surface 33a and the restriction surface 34a opposed to the pressing portion 33 can be changed by setting one of the plural restriction surfaces 34a at such a position as to be opposed to the pressing portion 33 by rotating the press-fitting jig 50. That is, in the embodiment, the restriction position, in the press-fitting direction, of the restriction portion 34 can be set according to the press-fitting component A and the press-fitting target component B by changing the combination of the dimension between the pair of flat surfaces 521 that are line-symmetrical with respect to the center axis of the press-fitting jig 50 and the projection height dimension H4 of the restriction portion 34 to be set so as to be opposed to the pressing portion 33 by rotating the press-fitting jig 50 by the position setting mechanism 40.

For example, in the example shown in FIG. 10B, the press-fitting jig 50 is located over the pressing surface 33a. Even in a case that the restriction portion 34 having a largest projection height H4 is located on the side of the pressing surface 33a, the restriction surface 34a is located over the pressing surface 33a. In this configuration, a first press-fitting interval dimension HT of a case that a restriction portion 34 having a large projection height H4 is located on the side of the pressing surface 33a is shorter than a second press-fitting interval dimension HT of a case that a restriction portion 34 having a small projection height H4 is located on the side of the pressing surface 33a.

Figure 12:
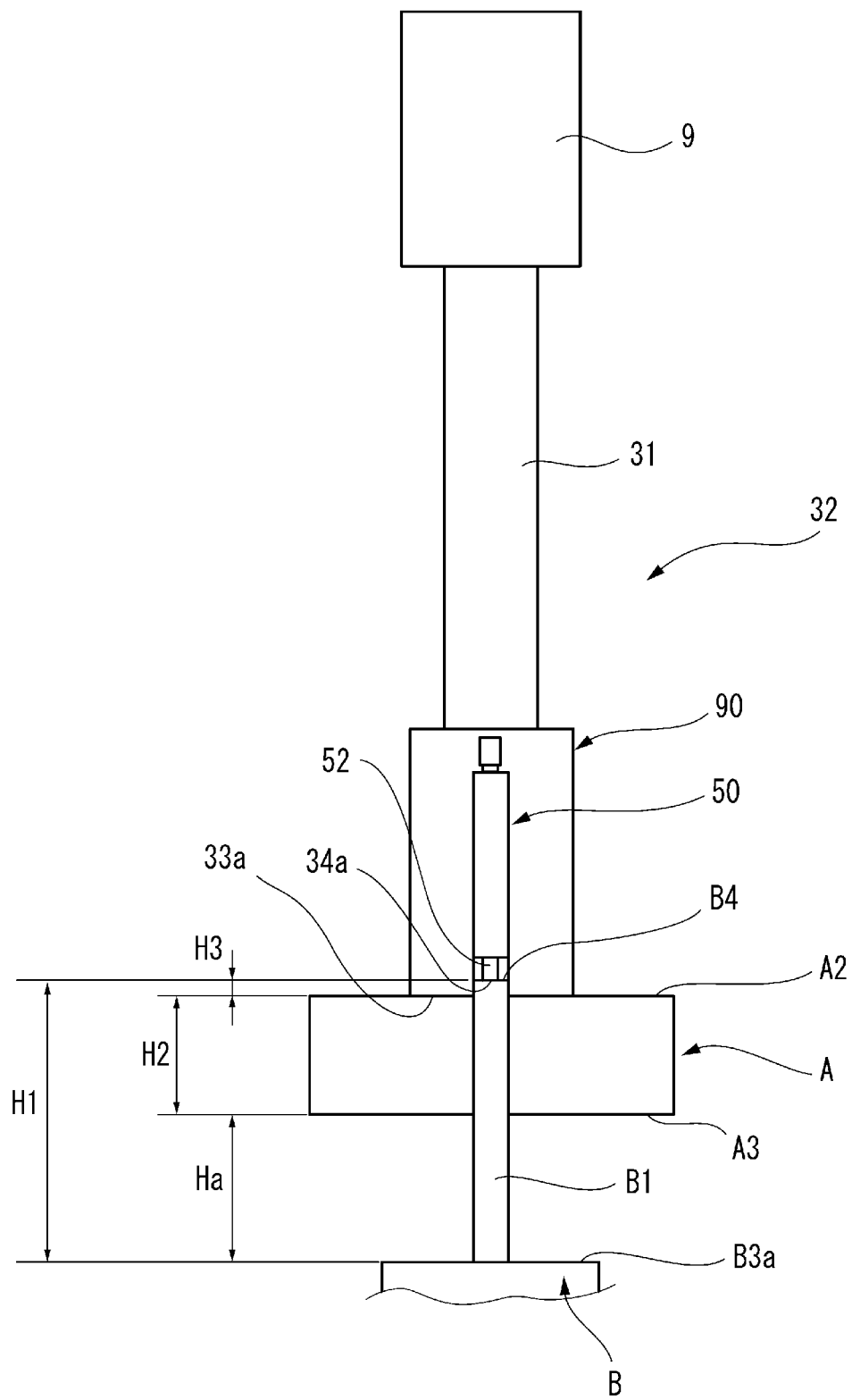
FIG. 12 is a schematic diagram showing the press-fitting component, the press-fitting target component, and the press-fitting jig immediately after completion of a press-fitting step.

FIG. 12 is a schematic diagram showing the impeller A (press-fitting component A), the rotor shaft B (press-fitting target component B), and the press-fitting jig 50 immediately after completion of the press-fitting step. FIG. 12 corresponds to FIG. 10D. As shown in FIG. 12, in this state, the pressing surface 33a is in contact with the top surface A2 of the impeller A and the restriction surface 34a is in contact with the top surface B4 of the shaft portion B1 of the rotor shaft B.

The length of the portion, from a step surface B3a of the rotor shaft B to the top surface B4 of its shaft portion B1, of the shaft portion B1 is called the first dimension H1. The first measuring portion 2 performs measurements including the first dimension H1.

The length of the impeller A along its rotation axis Ax is called the second dimension H2. The second measuring portion 3 performs measurements including measurement of the second dimension H2.

In the embodiment, the dimension that should be managed is the dimension Ha from the step surface B3a to the bottom surface A3 of the impeller A. When a press-fit product C is designed, a value of the dimension Ha is set. The value, set at the time of designing the press-fit product C, of the dimension Ha is called a "reference interval dimension Ha." In the embodiment, it is desired to produce a press-fit product C so that its value of this dimension becomes as close to the reference interval dimension Ha as possible. The reference interval dimension Ha is input to and stored in the storage portion 72 of the control portion 7 before execution of a press-fitting step.

In every industrial product, an allowance (allowable error value) is set for each dimension. Also in a press-fit product C to be produced by the press-fitting device 10 according to the embodiment, a difference may occur between the reference interval dimension Ha that was set at the time of designing and an actual value of this dimension of a press-fit product C produced using the press-fitting device 10. The produced press-fit product C is judged a good product if an absolute value of the difference is within an allowable error value. On the other hand, the produced press-fit product C is judged a defective product if the absolute value of the difference is larger than the allowable error value.

Incidentally, as seen from FIG. 12, the sum of the third dimension H3 from the top surface B4 of the shaft portion B1 of the rotor shaft B to the top surface A2 of the impeller A, the second dimension H2 from the top surface A2 to the bottom surface A3 of the impeller A, and the reference interval dimension Ha is equal to the first dimension H1 which is the length from the step surface B3a of the rotor shaft B to the top surface B4 of its shaft portion B1. That is, a relationship H3+H2+Ha=H1 holds. Whereas the reference interval dimension Ha, the first dimension H1, and the second dimension H2 have unique, fixed values, the third dimension H3 is an adjustable, variable value. By modifying the above equation, a relationship H3=H1−H2−Ha is obtained, according to which a third dimension H3 can be calculated which is a variable value.

In this press-fitting method, to perform press-fitting so that the reference interval dimension Ha is kept equal to a prescribed value even if the first dimension H1 and the second dimension H2 vary, the position of the impeller A in the press-fitting direction is controlled by the press-fitting tool 32. For example, where a second press-fit product CB is produced after a first press-fit product CA, there may occur an event that the second dimension H2 of the impeller A of the second press-fit product CB is larger than that of the impeller A of the first press-fit product CA due to, for example, a variation of that dimension of the component.

In this case, when the second press-fit product CB is produced, the reference interval dimension Ha at the time of production of the second press-fit product CB can be made equal to that at the time of production of the first press-fit product CA by adjusting the third dimension H3 so that it becomes smaller than that at the time of production of the first press-fit product CA.

The third dimension H3 is a dimension that is obtained when the pressing surface 33a presses the top surface A2 of the impeller A and the restriction surface 34a comes into contact with the top surface B4 of the shaft portion B1 of the rotary shaft B. Furthermore, as described above, the press-fitting interval dimension HT is an interval dimension between the press-fitting stop position of the pressing surface 33a and the press-fitting stop position of the restriction surface 34a, the interval dimension being set according to the third dimension H3 that is set by the pressing mechanism 30 in the press-fitting step to obtain the reference interval dimension Ha. That is, the reference interval dimension Ha can be made equal to a desired value by setting the press-fitting interval dimension HT equal to the third dimension H3.

In the press-fitting method according to the embodiment, the press-fitting position adjusting step includes an interval calculating step of calculating a press-fitting interval dimension HT based on the first dimension H1 which is a length of the press-fitting target component B in the press-fitting direction, the second dimension H2 which is a length of the press-fitting component A in the press-fitting direction, and the reference interval dimension Ha.

In the embodiment, the press-fitting interval dimension HT can be set at a value that is close to the third dimension H3 by selecting one proper restriction portion 34 from the plural restriction portions 34 that are different from each other in the projection height H4.

For example, where the first dimension H1 is 20.000 mm, the second dimension H2 is 9.979 mm, and the reference interval dimension Ha is 10.000 mm, the third dimension H3 is calculated as follows: 20.000−9.979−10.000=0.021 mm. In this case, a restriction portion 34 is selected that makes the press-fitting interval dimension HT closest to 0.021 mm.

In the following, a method for selecting a restriction portion 34 so as to obtain a press-fitting interval dimension HT that makes a press-fit product C produced by press-fitting the impeller A with the rotor shaft B have a reference interval dimension Ha value that is closest to the intended reference interval dimension Ha.

FIG. 13 is a table of sets of pieces of information of plural restriction portions 34 of the press-fitting device 10. In this example, it is assumed that the difference between the press-fitting stop position of the flat surface 521 opposed to the pressing portion 33 and the press-fitting stop position of the pressing surface 33a is equal to 10.000 mm. And a position of the restriction surface 34a is given a positive value if it is located under the pressing surface 33a and is given a negative value if it is located over the pressing surface 33a.

The projection height H4 of a first restriction portion 341 is 10.040 mm, and hence the difference (press-fitting interval dimension HT) between the restriction surface 34a of the first restriction portion 341 and the pressing surface 33a is equal to 0.040 mm.

The projection height H4 of a second restriction portion 342 is 10.020 mm, and hence the press-fitting interval dimension HT is equal to 0.020 mm.

The projection height H4 of a third restriction portion 343 is 10.000 mm, and hence the press-fitting interval dimension HT is equal to 0.000 mm.

The projection height H4 of a fourth restriction portion 344 is 9.980 mm, and hence the press-fitting interval dimension HT is equal to −0.020 mm.

The projection height H4 of a fifth restriction portion 345 is 9.960 mm, and hence the press-fitting interval dimension HT is equal to −0.040 mm.

In the above-described example, the press-fitting interval dimension HT is desired to be set at 0.021 mm. Thus, among the first restriction portion 341 to the fifth restriction portion 345, the second restriction portion 342 provides a press-fitting interval dimension HT that is closest to 0.021 mm. In this example, the control portion 7 selects the second restriction portion 342.

In the embodiment, the projection heights H4 of the respective restriction portions 34 are set taking an allowable error value into consideration. That is, the restriction portions 34 are designed so that their projection heights H4 change stepwise with an interval 0.02 mm. Thus, the range of the press-fitting interval dimension HT in which the first restriction portion 341 can be used is from 0.030 mm (inclusive) to 0.050 mm (not inclusive). The range of the press-fitting interval dimension HT in which the second restriction portion 342 can be used is from 0.010 mm (inclusive) to 0.030 mm (not inclusive). The range of the press-fitting interval dimension HT in which the third restriction portion 343 can be used is from −0.010 mm (inclusive) to 0.010 mm (not inclusive). The range of the press-fitting interval dimension HT in which the fourth restriction portion 344 can be used is from −0.030 mm (inclusive) to −0.010 mm (not inclusive). The range of the press-fitting interval dimension HT in which the fifth restriction portion 345 can be used is from −0.050 mm (inclusive) to −0.030 mm (not inclusive).

In this example, the press-fitting interval dimension HT is set at 0.020 mm. If press-fitting is performed using the press-fitting tool 32 in which the second restriction portion 342 is selected, an actual value of the reference interval dimension Ha of a produced press-fit product becomes 20.000−9.979−0.020=10.001 mm. Whereas the reference interval dimension Ha is desired to be 10.000 mm, the actual value is 10.001 mm; that is, there occurs a difference 0.001 mm. However, in this example, since the allowable error value is set at 0.010 mm, the press-fit product C produced by performing press-fitting working using the second restriction portion 342 is judged a good product.

Whereas the press-fitting jig 50 employed in the embodiment is provided with the 10 restriction portions 34, the above example was described for the case that the five restriction portions 34 exist. Thus, in the above example using the five restriction portions 34, an absolute value of the difference between the reference interval dimension Ha and an actual value can fall within the allowable error value 0.010 mm if the third dimension H3 is larger than or equal to −0.050 mm and smaller than 0.050 mm.

The specific values of the respective members and portions used in the above example are just for description and the values of those members and portions are not limited to those values.

As described above, in the press-fitting method according to the embodiment, the pressing portion 33 has the single pressing surface 33a and the press-fitting jig 50 has the plural restriction surfaces 34a that are provided in advance at prescribed intervals. The press-fitting method includes a restriction surface selecting step of selecting one of the plural restriction surfaces 34a so as to obtain a press-fitting stop position that is suitable for a press-fitting interval dimension HT that is set according to dimensions of the press-fitting component A and the press-fitting target component B.

The press-fitting stop position adjusting step includes a press-fitting interval determining step of placing the pressing portion 33 and a selected restriction portion 34 at prescribed positions in the press-fitting tool 32 that make the difference between the press-fitting stop position of the pressing surface 33a of the pressing portion 33 and the press-fitting stop position of the restriction surface 34a of the restriction portion 34 equal to the press-fitting interval dimension HT that has been set by the press-fitting interval setting step.

More specifically, after selecting, for example, the second restriction portion 342 (as in the above example), the control portion 7 rotates the press-fitting jig 50 so that the selected second restriction portion 342 is located at such a position as to be opposed to the pressing portion 33. When the movable portion 31 is lowered in this state, first the pressing portion 33 comes into contact with the top surface A2 of the impeller A. When the movable portion 31 is lowered further, the impeller A is press-fitted with the rotor shaft B gradually by the pressing portion 33. When the movable portion 31 is lowered further after the pressing portion 33 came into contact with the top surface A2 of the impeller A, the restriction portion 34 comes into contact with the top surface B4 of the shaft portion B1 of the rotor shaft B. If judging that the restriction portion 34 has come into contact with the top surface B4 of the shaft portion B1 of the rotor shaft B, the control portion 7 stops the lowering of the movable portion 31. Since the second restriction portion 342 was selected in advance so that the press-fitting interval dimension HT becomes closest to the third dimension H3 and the press-fitting operation is restricted by the second restriction portion 342, the dimensional accuracy of the reference interval dimension Ha can be made within the range of the allowable error value.

As shown in FIG. 10B, if judging, before a start of a press-fitting step, that the restriction portion 34 opposed to the pressing portion 33 is not the selected restriction portion 34, the control portion 7 switches the restriction portion 34 by rotating the press-fitting jig 50 so that the selected restriction portion 34 comes to be opposed to the pressing portion 33. That is, the press-fitting stop position adjusting step includes a switching step of switching at least one of the pressing surface 33a and the restriction surface 34a to a selected one.

Incidentally, the production method according to the embodiment includes a press-fit product C inspecting step of measuring a completion interval dimension that is an interval in the press-fitting direction between a prescribed position of the press-fitting target component B, press-fitted in the press-fitting step, of a press-fit product C and a prescribed position of the press-fitting component A (in the above example, an actual dimension from the step surface B3a of the rotor shaft B and to the bottom surface A3 of the impeller A) and comparing the measured completion interval dimension with the reference interval dimension Ha.

Whether the produced press-fit product C is good or defective can be judged by carrying out an inspection to check whether the dimension (completion interval dimension) corresponding to the reference interval dimension Ha of the produced press-fit product C. In the above example, the press-fit product C is judged good if the completion interval dimension is in a range of 10.000 mm±0.010 mm and is judged defective if it is out of that range.

As described above, the press-fitting method according to the embodiment is a press-fitting method for press-fitting one of a press-fitting component A and a press-fitting target component B into or with the other by moving the one of the press-fitting component and the press-fitting target component in the press-fitting direction by the press-fitting tool 32, in which:

the press-fitting tool 32 includes:
  the pressing portion 33 having the pressing surface 33a configured to come into contact with the press-fitting component A; and
  the restriction portion 34 having the restriction surface 34a configured to come into contact with the press-fitting target component B, a press-fitting direction position of the pressing surface 33a of the pressing portion 33 and the press-fitting direction position of the restriction surface 34a of the restriction portion 34 are set so that the one of the press-fitting component A and the press-fitting target component B is stopped at a prescribed press-fitting stop position, the press-fitting method including:
the press-fitting stop position adjusting step of adjusting a press-fitting interval dimension HT in the press-fitting direction between the pressing surface 33a of the pressing portion 33 and the restriction surface 34a of the restriction portion 34 so as to obtain the press-fitting stop position that is set according to component dimensions of the press-fitting component A and component dimensions of the press-fitting target component B;
the press-fitting step of press-fitting the press-fitting component A with the press-fitting target component B; and
the press-fitting completion step of stopping the press-fitting of the press-fitting component A with the press-fitting target component B by bringing the restriction portion A into contact with the press-fitting target component B.

According to the press-fitting method of the embodiment, since the press-fitting interval dimension HT is adjusted so that the press-fitting stop position that is set according to the dimensions of the press-fitting component A and the press-fitting target component B, press-fitting stop positions can be made close to each other even when press-fitting components A having different sets of dimensions are press-fitted with respective press-fitting target components B.

The above-described embodiment is directed to the press-fitting device 10 in which the single pressing portion 33 and the plural restriction portions 34 are provided, the restriction position of the restriction surface 34a in the press-fitting direction is variable, and the pressing position of the pressing surface 33a in the press-fitting direction is fixed. However, the present disclosure is not limited to this configuration. The press-fitting device 10 may be configured in such a manner that it includes plural pressing portions 33 and a single restriction portion 34 and one of the plural pressing portions 33 is selected to obtain a proper press-fitting interval dimension HT. In this case, the pressing position is variable and the restriction position is fixed. As a further alternative, the press-fitting device 10 may be configured in such a manner that it includes plural pressing portions 33 and plural restriction portions 34 and a set of a pressing portion 33 and a restriction portion 34 is selected to obtain a proper press-fitting interval dimension HT. In this case, the pressing position and the restriction position are both variable.

Although in the above-described embodiment the press-fitting component A is an impeller and the press-fitting target component B is a rotor shaft, the present disclosure can also be applied to a case of press-fitting a rotor shaft into an impeller. Furthermore, the present disclosure can be applied to production of press-fit products other than press-fit products including an impeller and a rotor shaft.

Although in the above-described embodiment the press-fitting direction is the vertical direction, the present disclosure is not limited to this case. The present disclosure can be applied irrespective of the press-fitting direction; for example, the press-fitting direction may be a horizontal direction.

Figure 14A:
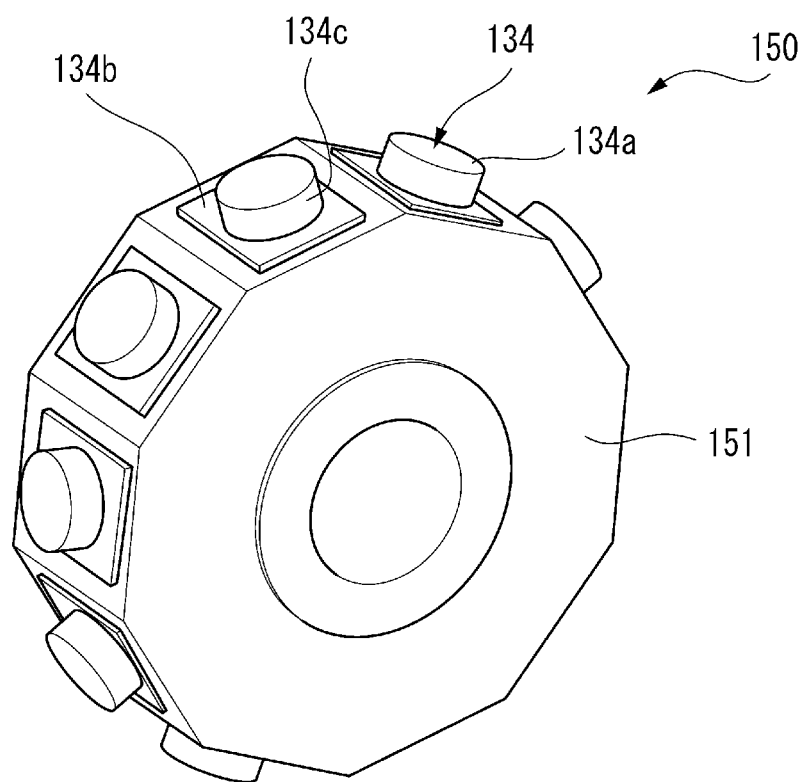
FIG. 14A is a perspective view showing a press-fitting jig according to a first modification.
Figure 14B:
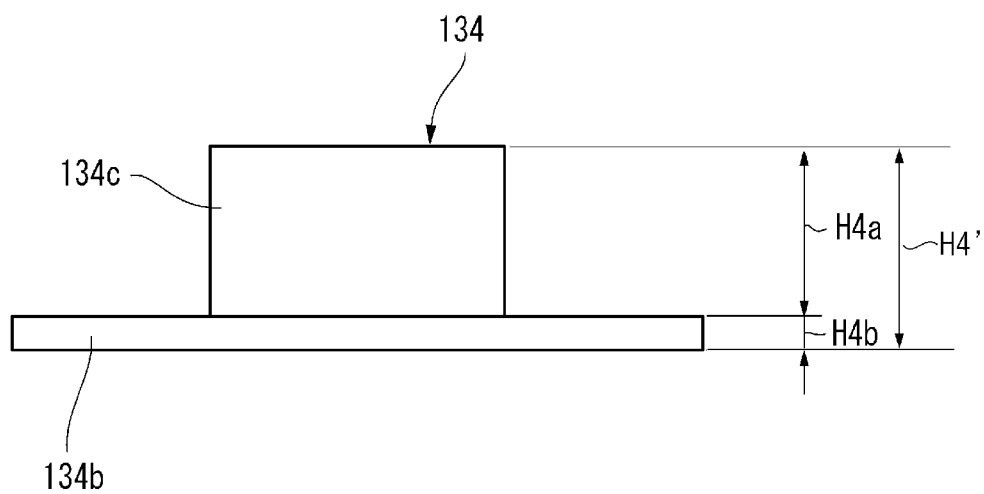
FIG. 14B is a partial side view showing the press-fitting jig according to the first modification.
Figure 15:
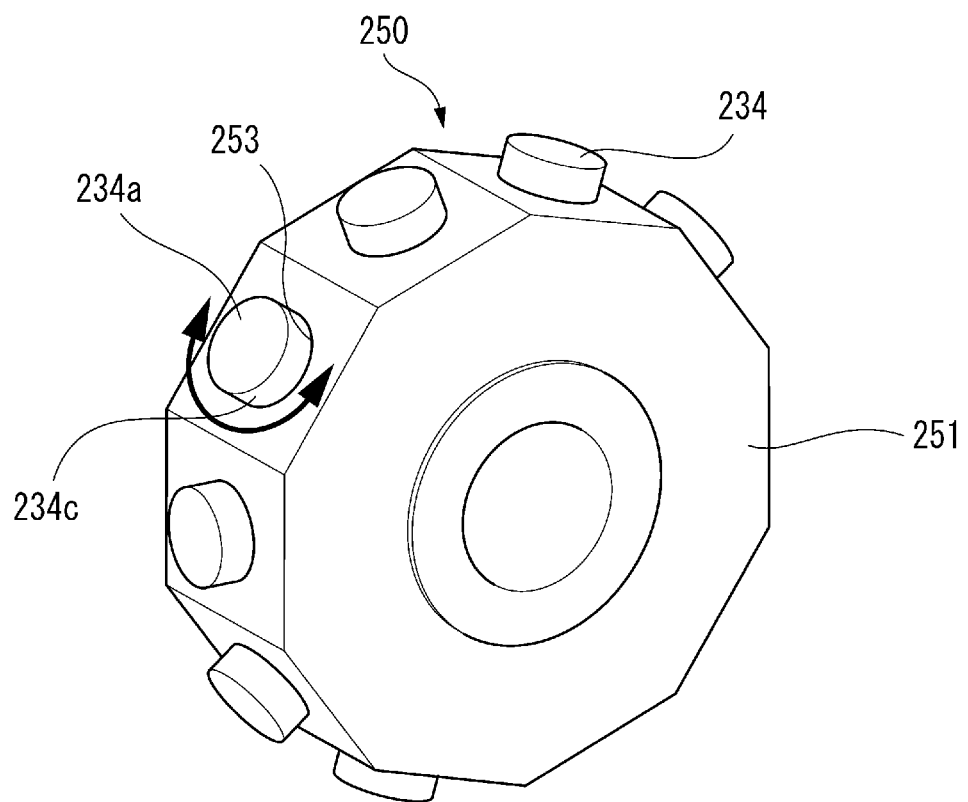
FIG. 15 is a perspective view showing a press-fitting jig according to a second modification.

Although in the above-described embodiment each restriction portion 34 is fitted in the associated mounting portion 53 (see FIG. 6), the present disclosure is not limited to this case. A press-fitting jig 50 may be configured as shown in FIGS. 14A and 14B or FIG. 15. FIGS. 14A and 14B show a press-fitting jig 150 according to a first modification. FIG. 15 shows a press-fitting jig 250 according to a second modification.

In the first modification shown in FIG. 14A, each restriction portion 134 includes a cylindrical portion 134c having a restriction surface 134a and a shim plate 134b which is sandwiched between the cylindrical portion 134c and a flat surface 521. The cylindrical portions 134c of the respective restriction portions 134 have the same height H4a (measured along the rotation-symmetry axis of each cylindrical portion 134c) (see FIG. 14B). The shim plates 134b of the respective restriction portions 134 have different thicknesses H4b (see FIG. 14B). Each restriction portion 134 is attached to a main body 151 by insertion of the shim plate 134b between cylindrical portion 134c and the flat surface 521. The projection height H4' (see FIG. 14B) of the restriction surface 134a from the flat surface 521 (see FIG. 5) varies depending on the thickness of the shim plate 134b.

In the second modification shown in FIG. 15, each restriction portion 234 includes a cylindrical portion 234c having a restriction surface 234a and a screw portion (not shown) that projects from the bottom surface of the cylindrical portion 234c. Amounting portion 253 is a screw hole. Each restriction portion 234 can be replaced easily by screwing a restriction portion 234 into the mounting portion 253, without changing a main body 251 of the press-fitting jig 250.

Figure 16:
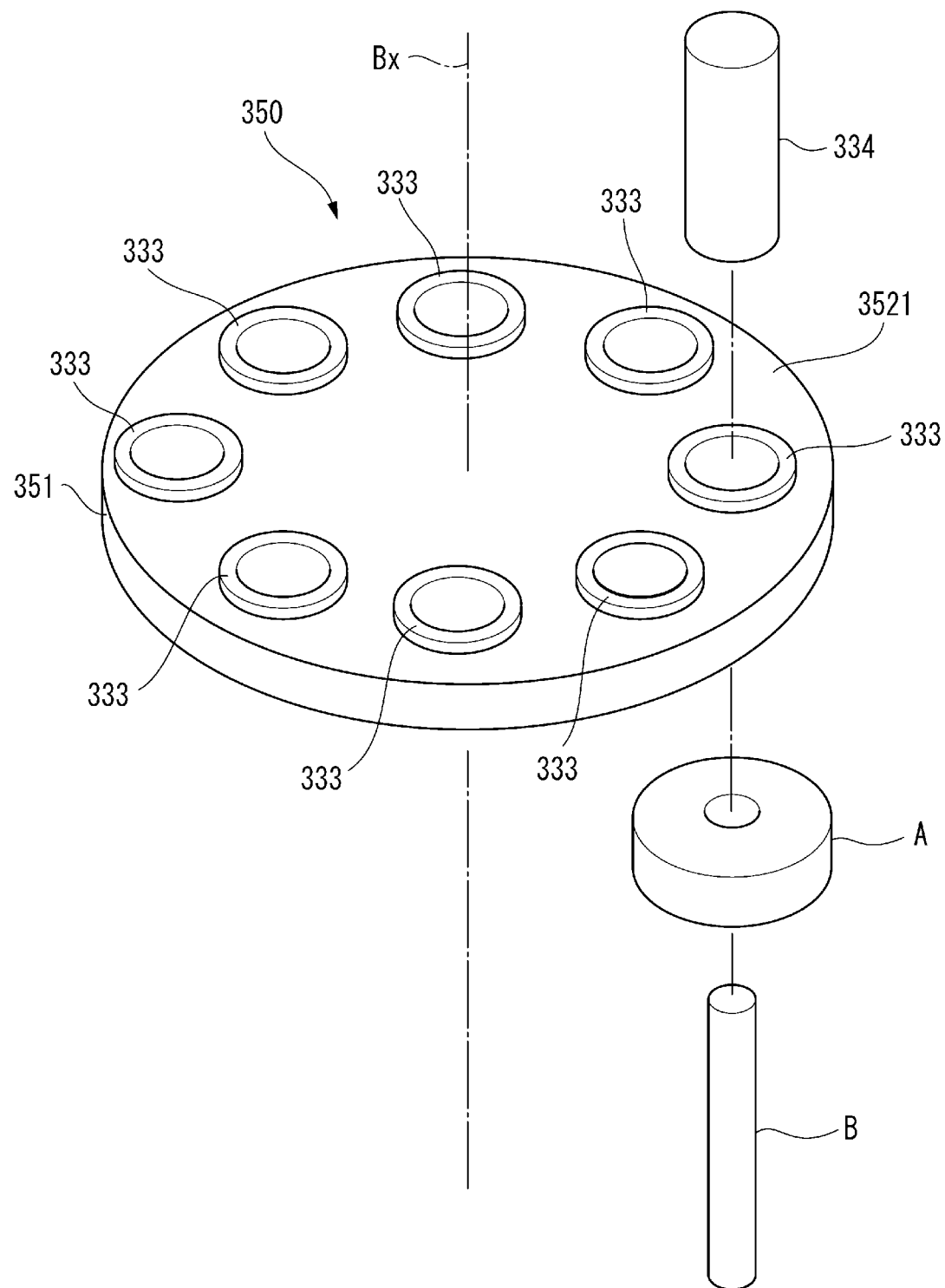
FIG. 16 is an exploded perspective view showing a press-fitting jig according to a third modification.

The press-fitting device 10 according to the present disclosure is not limited to the case that the arrangement portion 52 has the plural flat surfaces 521 that extend parallel with the rotation axis Bx. FIG. 16 is an exploded perspective view showing a press-fitting jig 350 according to a third modification of the present disclosure. As shown in FIG. 16, the press-fitting jig 350 according to the third modification includes a disc-shaped main body 351 and plural pressing portions 333. A press-fitting device 310 according to the third modification includes one restriction portion 334 and the plural pressing portions 333. The restriction position is fixed and the pressing position is variable. The rotation axis Bx of the press-fitting jig 350 extends in the vertical direction.

The plural pressing portions 333 are provided on respective crossing points of a circumference of a circle that is set on the main body 351 as a circle around the rotation axis Bx of the main body 351 of the press-fitting jig 350 and radial lines that are extended from the rotation axis Bx in radially. The pressing portions 333 are arranged at prescribed intervals on the circumference of the circle around the rotation axis Bx. One desired pressing portion 333 can be placed at such a position as to be able to touch the press-fitting component A by rotating this press-fitting jig 350 about the rotation axis Bx.

Figure 17:
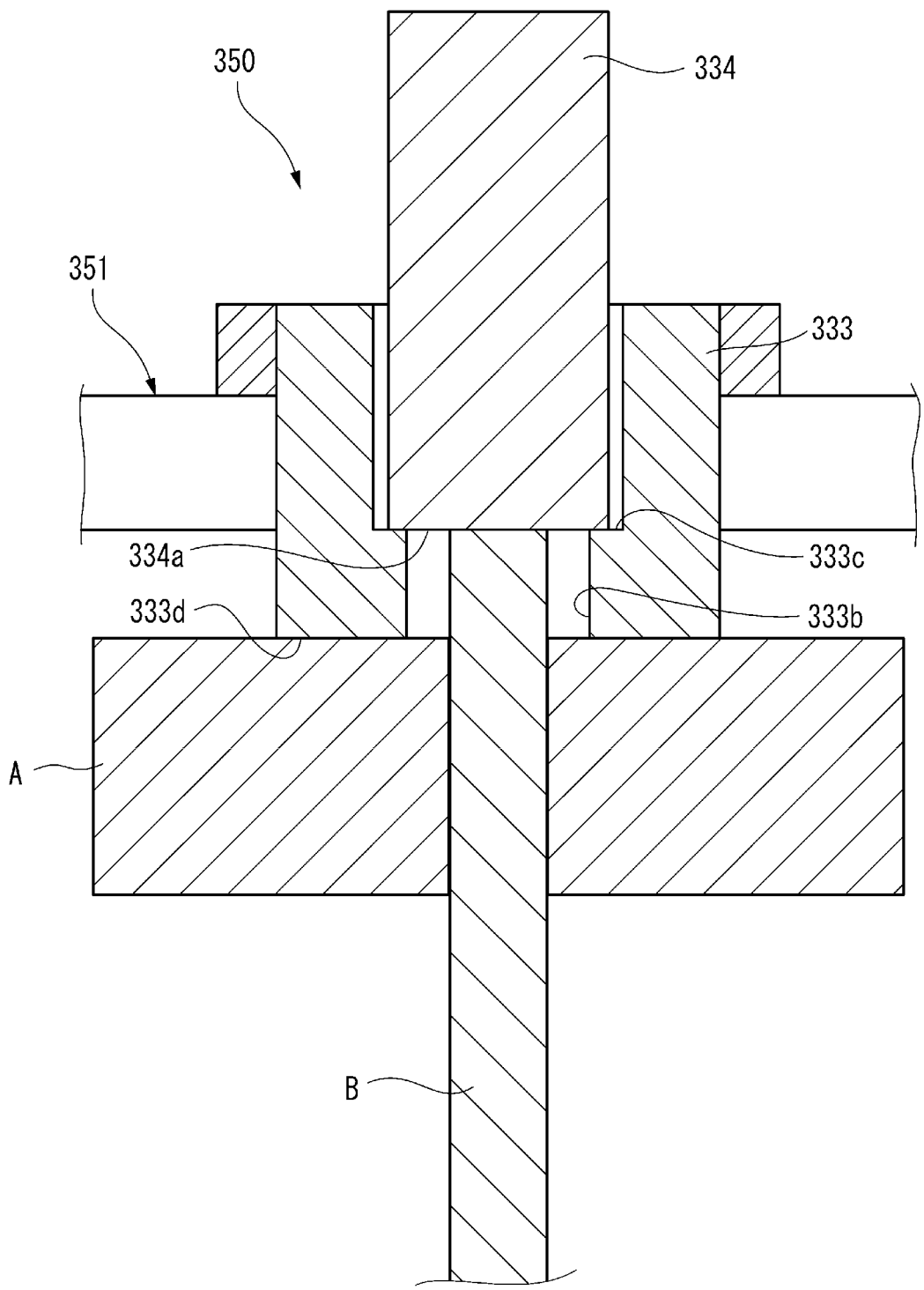
FIG. 17 is a sectional view of the press-fitting jig shown in FIG. 16.

FIG. 17 is a sectional view of the press-fitting jig 350 according to the third modification shown in FIG. 16. FIG. 17 shows a state that the restriction portion 334 is in contact with the press-fitting target component B. A hole 333b penetrates through each pressing portion 333 at its center in the top-bottom direction. The hole 333b has a lower, small-diameter hole and an upper, large-diameter hole and a boundary surface 333c is formed at their boundary. The inner diameter of the large-diameter hole is larger than the outer diameter of the restriction portion 334 and the inner diameter of the small-diameter hole is smaller than the outer diameter of the restriction portion 334. When the restriction portion 334 is lowered from a position located above, it comes into contact with the boundary surface 333c, a relative positional relationship between the restriction portion 334a and the selected pressing surface 333d is set. The length from a bottom surface 333d of the pressing portion 333 to the boundary surface 333c becomes a press-fitting interval dimension HT. When the restriction portion 334 is lowered further, it lowers the pressing portion 333 and the main body 351 together with it and can press-fit the press-fitting component A with the press-fitting target component B.

The plural pressing portions 333 are different from each other in the length from the bottom surface 333d to the boundary surface 333c. Thus, a pressing portion 333 having a press-fitting interval dimension HT to be set can be placed at such a position as to be able to touch the press-fitting component A by rotating the disc-shaped main body 351.

Although the embodiment of the present disclosure has been described above, it goes without saying that the technical scope of the present disclosure should not be construed restrictively by the description of the embodiment. It would be understood by those skilled in the art that the embodiment is just an example and can be modified in various manners within the confines of the present disclosure as set forth in the claims. The technical scope of the present disclosure should be determined on the basis of the scope of the present disclosure as set forth in the claims and its equivalents.

The contents disclosed in the Singapore patent application filed on Dec. 1, 2020 (Patent Application No. 10202011992W) are incorporated in this application by reference.

REFERENCE SIGNS LIST

1: Production device
2: First measuring portion
3: Second measuring portion
4: Tentative press-fitting portion
5: Press-fitting portion
6: Inspection portion
7: Control portion
8: Switching drive source
10: Press-fitting device
30: Pressing mechanism
40: Position setting mechanism
50: Press-fitting jig
51: Main body
52: Arrangement portion
521: Flat surface
53: Mounting portion
54: Rotation axis portion
60: Jig support portion
80: Rotation mechanism
90: Press-fitting movable body
100: Jig support unit
A: Press-fitting component (impeller)
A1: Insertion hole
A2: Top surface
B: Press-fitting target component (rotor shaft)
B1: Shaft portion
B2: Rotary main body
B3a: Step surface
B4: Top surface
C: Press-fit product

The invention claimed is:

1. A press-fitting method for press-fitting one of a press-fitting component and a press-fitting target component into or with the other by moving the one of the press-fitting component and the press-fitting target component in a press-fitting direction using a press-fitting tool, wherein:
the press-fitting tool comprises:
a pressing portion having a pressing surface configured to come into contact with the press-fitting component; and
a restriction portion having a restriction surface configured to come into contact with the press-fitting target component,
a press-fitting direction position of the pressing surface of the pressing portion and a press-fitting direction position of the restriction surface of the restriction portion are set so that the one of the press-fitting component and the press-fitting target component is stopped at a prescribed press-fitting stop position,
the press-fitting method comprising:
adjusting a press-fitting interval dimension in the press-fitting direction between the pressing surface of the pressing portion and the restriction surface of the restriction portion so as to obtain the press-fitting stop position of the press-fitting component that is set in the press-fitting target component according to component dimensions of the press-fitting component and component dimensions of the press-fitting target component;
press-fitting the press-fitting component with the press-fitting target component; and
stopping the press-fitting of the press-fitting component with the press-fitting target component by bringing the restriction portion into contact with the press-fitting target component.

2. The press-fitting method according to claim 1, wherein the stopping the press-fitting comprises detecting that a pressure acting on the press-fitting tool reaches a preset, prescribed value.

3. The press-fitting method according to claim 1, wherein the adjusting the press-fitting interval dimension comprises setting the press-fitting interval dimension so that an absolute value of a difference between a preset reference interval dimension to be managed and an actual value of the reference interval dimension of a press-fit product produced using the press-fitting interval dimension becomes smaller than a predetermined allowable error value.

4. The press-fitting method according to claim 3, wherein the adjusting the press-fitting interval dimension comprises calculating the press-fitting interval dimension based on a first dimension that is a length of the press-fitting target component in the press-fitting direction, a second dimension that is a length of the press-fitting component in the press-fitting direction, and the reference interval dimension.

5. The press-fitting method according to claim 3, wherein the adjusting the press-fitting interval dimension comprises placing the pressing portion and the restriction portion at prescribed positions in the press-fitting tool that make the difference between the press-fitting direction position of the pressing surface of the pressing portion and the press-fitting direction position of the restriction surface of the restriction portion equal to the press-fitting interval dimension that is set by the setting the press-fitting interval dimension.

6. The press-fitting method according to claim 3, wherein:
the press-fitting the press-fitting component comprises moving the press-fitting tool in the press-fitting direction from a state that the pressing surface and the restriction surface are located at respective execution initial positions; and
the adjusting the press-fitting interval dimension comprises placing the pressing surface and the restriction surface to the respective execution initial positions by moving at least one of the pressing portion and the restriction portion so that the difference between the press-fitting direction position of the pressing surface and the press-fitting direction position of the restriction surface becomes equal to the press-fitting interval dimension that is set by the setting the press-fitting interval dimension.

7. The press-fitting method according to claim 3, wherein:
the press-fitting target component has a large-diameter portion, a small-diameter portion that is smaller in diameter than the large-diameter portion, and a step surface that connects the large-diameter portion and the small-diameter portion;
the press-fitting component is a component that extends in the press-fitting direction and is shaped like a cylinder or a polygonal prism, and has a hole that extends in the press-fitting direction and through which the small-diameter portion is to be inserted; and the small-diameter portion extends in the press-fitting direction by a length being longer than the reference interval dimension from the step surface.

8. The press-fitting method according to claim 1, wherein:
the restriction portion has a single restriction surface; and
the pressing portion has plural pressing surfaces that are provided in advance at a prescribed interval,
the press-fitting method further comprising:
selecting one of the plural pressing surfaces so as to obtain the press-fitting stop position that is suitable for the press-fitting interval dimension that is set according to dimensions of the press-fitting component and the press-fitting target component.

9. The press-fitting method according to claim 8, wherein the adjusting the press-fitting interval dimension comprises switching to at least one of the selected pressing surface and the selected restriction surface.

10. The press-fitting method according to claim 1, wherein:
the pressing portion has a single pressing surface; and
the restriction portion has plural restriction surfaces that are provided in advance at a prescribed interval,
the press-fitting method further comprising:
selecting one of the plural restriction surfaces so as to obtain the press-fitting stop position that is suitable for the press-fitting interval dimension that is set according to dimensions of the press-fitting component and the press-fitting target component.

11. A production method for producing a press-fit product in which a press-fitting component is fitted with a press-fitting target component, comprising:
preparing the press-fitting component and the press-fitting target component; and
press-fitting one of the press-fitting component and the press-fitting target component into or with the other by moving the one of the press-fitting component and the press-fitting target component in a press-fitting direction using a press-fitting tool, wherein:
the press-fitting tool comprises:
a pressing portion having a pressing surface configured to come into contact with the press-fitting component; and
a restriction portion having a restriction surface configured to come into contact with the press-fitting target component,
a press-fitting direction position of the pressing surface of the pressing portion and a press-fitting direction position of the restriction surface of the restriction portion are set so that the one of the press-fitting component and the press-fitting target component is stopped at a prescribed press-fitting stop position; and
the press-fitting the one of the press-fitting component and the press-fitting target component comprises:
adjusting a press-fitting interval dimension in the press-fitting direction between the pressing surface of the pressing portion and the restriction surface of the restriction portion so as to obtain the press-fitting stop position that is set according to component dimensions of the press-fitting component and component dimensions of the press-fitting target component;
press-fitting the press-fitting component with the press-fitting target component; and
stopping the press-fitting of the press-fitting component with the press-fitting target component by bringing the restriction portion into contact with the press-fitting target component.

12. The press-fitting method according to claim 11, wherein the stopping the press-fitting comprises detecting that a pressure acting on the press-fitting tool reaches a preset, prescribed value.

13. The production method according to claim 11, wherein the adjusting the press-fitting interval dimension comprises setting the press-fitting interval dimension so that an absolute value of a difference between a preset reference interval dimension to be managed and an actual value of the reference interval dimension of a press-fit product produced using the press-fitting interval dimension becomes smaller than a predetermined allowable error value.

14. The production method according to claim 13, wherein:
the preparing the press-fitting component and the press-fitting target component comprises:
measuring and acquiring a first dimension that is a length of the press-fitting target component in the press-fitting direction; and
measuring and acquiring a second dimension that is a length of the press-fitting component in the press-fitting direction; and
the adjusting the press-fitting interval dimension comprises calculating the press-fitting interval dimension based on the first dimension, the second dimension, and the reference interval dimension.

15. The production method according to claim 13, wherein:
the press-fitting the press-fitting component comprises moving the press-fitting tool in the press-fitting direction from a state that the pressing surface and the restriction surface are located at respective execution initial positions; and
the adjusting the press-fitting interval dimension comprises placing the pressing surface and the restriction surface to the respective execution initial positions by moving at least one of the pressing portion and the restriction portion so that the difference between the press-fitting direction position of the pressing surface and the press-fitting direction position of the restriction surface becomes equal to the press-fitting interval dimension that is set by the setting the press-fitting interval dimension.

16. The press-fitting method according to claim 13, further comprising:
measuring a completion interval dimension that is an interval in the press-fitting direction between a prescribed position of the press-fitting target component of the press-fit product produced by the press-fitting the press-fitting component and a prescribed position of the press-fitting component of the press-fit product, and comparing the measured completion interval dimension with the reference interval dimension.

17. The production method according to claim 11, further comprising:
press-fitting the press-fitting component with the press-fitting target component tentatively.

18. The production method according to claim 11, wherein:
the restriction portion has a single pressing surface;
the restriction portion has plural restriction surfaces that are provided in advance at a prescribed interval; and
the press-fitting the one of the press-fitting component and the press-fitting target component comprises selecting one of the plural restriction surfaces so as to obtain the press-fitting stop position that is suitable for the press-fitting interval dimension that is set according to dimensions of the press-fitting component and the press-fitting target component.

19. The press-fitting method according to claim 11, wherein the adjusting the press-fitting interval dimension comprises switching to the selected restriction surface.

* * * * *